United States Patent
Savvides et al.

(10) Patent No.: US 12,067,527 B2
(45) Date of Patent: *Aug. 20, 2024

(54) SYSTEM AND METHOD FOR IDENTIFYING MISPLACED PRODUCTS IN A SHELF MANAGEMENT SYSTEM

(71) Applicant: CARNEGIE MELLON UNIVERSITY, Pittsburgh, PA (US)

(72) Inventors: Marios Savvides, Wexford, PA (US); Sreena Nallamothu, Pittsburgh, PA (US); Magesh Kannan, Pittsburgh, PA (US); Uzair Ahmed, Pittsburgh, PA (US); Ran Tao, Pittsburgh, PA (US); Yutong Zheng, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 333 days.

This patent is subject to a terminal disclaimer.

(21) Appl. No.: 17/400,996

(22) Filed: Aug. 12, 2021

(65) Prior Publication Data

US 2022/0051177 A1 Feb. 17, 2022

Related U.S. Application Data

(60) Provisional application No. 63/069,455, filed on Aug. 24, 2020, provisional application No. 63/065,912, (Continued)

(51) Int. Cl.
*G06Q 10/087* (2023.01)
*G06F 16/583* (2019.01)
(Continued)

(52) U.S. Cl.
CPC ....... *G06Q 10/087* (2013.01); *G06F 16/5846* (2019.01); *G06F 18/2113* (2023.01);
(Continued)

(58) Field of Classification Search
CPC .............. G06Q 10/087; G06F 16/5846; G06F 18/2113; G06F 18/214; G06F 18/28;
(Continued)

(56) References Cited

U.S. PATENT DOCUMENTS 8,577,136 B1 11/2013 Ascher
8,630,924 B2 1/2014 Groenevelt
(Continued)

FOREIGN PATENT DOCUMENTS

WO 2018204342 A1 11/2018

OTHER PUBLICATIONS

Baditha, Rajeev. Solving Object Detection and Localization in an Image. Indian Statistical Institute—Kolkata ProQuest Dissertations Publishing, 2017. (Year: 2017).*
(Continued)

*Primary Examiner* — Florian M Zeender
*Assistant Examiner* — Fawaad Haider
(74) *Attorney, Agent, or Firm* — KDW Firm PLLC

(57) ABSTRACT

Disclosed herein is a system and method of identifying misplaced products on a retail shelf using a feature extractor trained to extract features from images of products on the shelf and output identifying information regarding the product in the product image. The extracted features are compared to extracted features in a product library and a best fit is obtained. A misplaced product is identified if the identifying information produced by the feature extractor fails to match the identifying information associated with the best fit features from the product library.

15 Claims, 22 Drawing Sheets

Related U.S. Application Data filed on Aug. 14, 2020, provisional application No. 63/064,670, filed on Aug. 12, 2020.

(51) Int. Cl.
| | |
|---|---|
| *G06F 18/2113* | (2023.01) |
| *G06F 18/214* | (2023.01) |
| *G06F 18/28* | (2023.01) |
| *G06V 10/40* | (2022.01) |
| *G06V 10/75* | (2022.01) |
| *G06V 20/52* | (2022.01) |
| *H04N 7/18* | (2006.01) |

(52) U.S. Cl.
CPC ............ *G06F 18/214* (2023.01); *G06F 18/28* (2023.01); *G06V 10/40* (2022.01); *G06V 10/751* (2022.01); *G06V 20/52* (2022.01); *H04N 7/18* (2013.01)

(58) Field of Classification Search
CPC ...... G06V 10/40; G06V 10/751; G06V 10/82; G06V 20/52; H04N 7/18
USPC .......................................................... 705/22
See application file for complete search history.

(56) References Cited

U.S. PATENT DOCUMENTS

| | | |
|---|---|---|
| 2008/0077511 A1 | 3/2008 | Zimmerman |
| 2013/0250041 A1 | 9/2013 | Chou |
| 2015/0052027 A1 | 2/2015 | Pavani et al. |
| 2016/0171707 A1 | 6/2016 | Schwartz |
| 2017/0286773 A1* | 10/2017 | Skaff ................... G06V 10/255 |
| 2017/0286901 A1 | 10/2017 | Skaff |
| 2017/0293959 A1 | 10/2017 | Itou |
| 2018/0005035 A1 | 1/2018 | Bogolea |
| 2018/0005176 A1 | 1/2018 | Williams |
| 2018/0101813 A1 | 4/2018 | Paat |
| 2018/0107999 A1 | 4/2018 | Rizzolo |
| 2018/0315007 A1 | 11/2018 | Kingsford |
| 2019/0065861 A1 | 2/2019 | Savvides |
| 2019/0087772 A1 | 3/2019 | Medina |
| 2019/0163698 A1* | 5/2019 | Kwon ..................... G06F 16/51 |
| 2019/0197561 A1 | 6/2019 | Adato |
| 2019/0354923 A1 | 11/2019 | Taira |
| 2020/0005225 A1 | 1/2020 | Chaubard |
| 2020/0118064 A1 | 4/2020 | Perrella |
| 2020/0184170 A1 | 6/2020 | Reza |
| 2020/0380317 A1 | 12/2020 | Ghazel |

OTHER PUBLICATIONS

Extended European Search Report and Written Opinion for Application No. EP20786824, mailed Oct. 26, 2022, 10 pages.

Kejriwal, Nishant, Sourav Garg, and Swagat Kumar. "Product counting using images with application to robot-based retail stock assessment." 2015 IEEE international conference on technologies for practical robot applications (TePRA). IEEE, 2015. (Year: 2015).

Rosado, Lufs, et al. "Supervised learning for Out-of-Stock detection in panoramas of retail shelves." 2016 IEEE International Conference on Imaging Systems and Techniques (IST). IEEE, 2016. (Year: 2016).

International Search Report and Written Opinion for International Patent Application No. PCT/US20/27984 mailed on Jul. 24, 2020, 9 pages.

International Search Report and Written Opinion for International Patent Application No. PCT/US2020/027977 mailed on Jul. 24, 2020, 8 pages.

International Search Report and Written Opinion for International Patent Application No. PCT/US20/27980 mailed on Jul. 15, 2020, 9 pages.

* cited by examiner

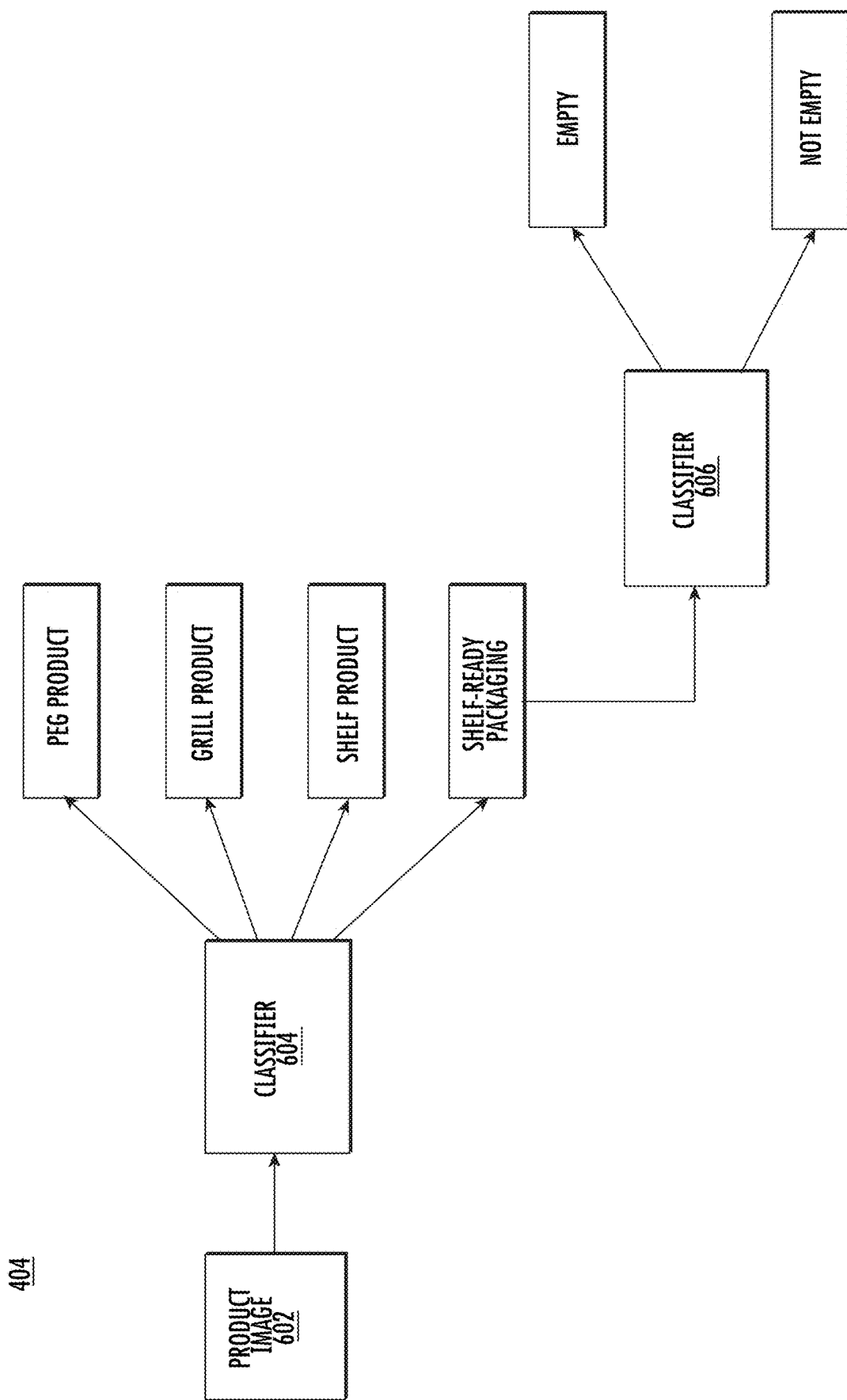

SYSTEM AND METHOD FOR IDENTIFYING MISPLACED PRODUCTS IN A SHELF MANAGEMENT SYSTEM

RELATED APPLICATIONS

This application claims the benefit of U.S. Provisional Patent Applications Nos. 63/064,670, filed Aug. 12, 2020, entitled "Plug Solution for Shelf Management System", 63/065,912, filed Aug. 14, 2020, entitled "System and Method to Recognize Misplaced Objects" and 63/069,455, filed Aug. 24, 2020, entitled "Spreads Recognition in Plugs Pipeline". The contents of these applications are incorporated herein in their entireties.

FIELD OF THE INVENTION

The present invention is related to the field of automated inventory monitoring in a commercial retail setting and, in particular, is directed to systems, processes and methods for automatically tracking products displayed in the retail setting through the use of a mobile robot having a multiple camera sensor suite mounted thereon.

BACKGROUND OF THE INVENTION

Retail stores, for example, grocery stores, general merchandise stores, dry goods stores or warehouse style stores can have thousands of distinct products that are often concurrently offered for sale. Stores are typically laid out in an aisle configuration wherein each aisle may have shelves of products placed on one or both sides of the aisle. At the ends of the aisle, the shelves will typically have "end caps" which often contain products that the store wishes to promote to its customers. As such, the contents of the end caps may frequently change. In addition, the inventory of the stores may constantly be modified by removing, adding or repositioning the products. As customers purchase the products, products may become out-of-stock and may need to be re-ordered from a wholesaler.

The shelves in the store are typically provided with shelf labels. The shelf labels serve two purposes. The first is the identification of the product which is to be placed on the shelves in close proximity to the shelf label. The label may comprise bar code or QR code printed on the shelf label identifying the product. The shelf label also typically contains the unit price of the product and may contain other miscellaneous information specific to the particular store.

The second purpose of the shelf label is to indicate a position on the shelf where the product should be placed. For example, a particular store may place the shelves labels at the far left of the area on the shelf where the associated product is to be positioned (i.e., left justified product placement). It is therefore incumbent on the staff of the store to properly place the products when restocking the shelves. This will also aid the system of the present invention as it attempts to match the actual products on the shelves with the product labels.

Even with frequent restocking schedules, products assumed to be in-stock may be out-of-stock, decreasing both sales and customer satisfaction. Point of sales data can be used to roughly estimate product stock levels, but does not help with identifying misplaced, stolen, or damaged products, all of which can reduce product availability. However, manually monitoring product inventory and tracking product position is expensive and time consuming.

One solution for tracking product inventory relies on planograms which are typically manually created for each individual store, in combination with machine vision technology. Given a planogram, machine vision can be used to assist in shelf space compliance. In such cases, the planogram may need to be manually created and manually updated each time a product is removed, added or repositioned within the store.

To implement machine vision technology relying on a planogram, one or more fixed position cameras can be used throughout a store to monitor aisles, with large gaps in shelf space being checkable against the planogram or shelf labels and flagged as "out-of-stock" if necessary. Alternatively, a number of movable cameras can be used to scan a store aisle. Even with such systems, human intervention is generally required to build an initial planogram that correctly represents the product layout on the fixture, and that includes detailed information relative to a bounding box that can include product identification, placement, and count. Substantial human intervention can also be required to update the planogram, as well as search for misplaced product inventory.

As such, it would be desirable to be able to automate the tracking of inventory to determine when various products are out-of-stock, have been repositioned, or are otherwise not where they are expected to be. In addition, it would be desirable to be able to implement such a system without the need for the manually created planograms.

SUMMARY OF THE INVENTION

Shelf monitoring and product tracking systems, methods and processes are disclosed herein. In preferred embodiments, a mobile, autonomous robot having a plurality of cameras mounted thereon navigates the aisles of the store to collect images of products on shelves and other fixtures such as pegs in the store. In other embodiments, images of products and fixtures in the store may be collected using any type of camera, including, without limitation, fixed-location cameras. Images of each aisle may be created and analyzed to determine the identity and status of products on the fixtures, the type and state of the fixtures, and other information about store environment. For example, the system may be capable of determining when products are out-of-stock, miss-positioned with respect to their proper positions on the shelves or wherein a product has been moved to an incorrect position in the store by a customer. In addition, the system is capable of determining when products have been moved by the store to another area of the shelf, removed from stock, or newly added to the store's inventory.

In preferred embodiments of the invention, the system analyzes the panoramic images to detect the presence of and, optionally, to determine the identity of products placed on the fixtures. Additionally, the system can analyze the panoramic images to identify shelf labels indicating which products are expected to be at various positions on the fixtures. The system is then able to match the placement of and, optionally, the identity of the products on the fixtures with the expected positions of the products to determine that the products are shelved properly, are miss-shelved or are out-of-stock. The system is further functional to flag misplaced and out-of-stock products and alert the store's staff such that the misplacement may be corrected or such that the product may be re-stocked.

Also disclosed herein is a system and method of identifying misplaced products using a feature extractor trained to extract features from product images and output identifying information regarding the product. The extracted features from the product images are compared to extracted features in a product library and a best-fit is obtained. The product library contains features extracted from multiple images of multiple products and associated identifying information. A misplaced product is identified if the identifying information produced by the feature extractor fails to match the identifying information associated with the best fit features from the product library.

BRIEF DESCRIPTION OF THE DRAWINGS

FIG. 6 is a block diagram of the two-tier classifier used to classify product images.

DEFINITIONS

Figure 1:
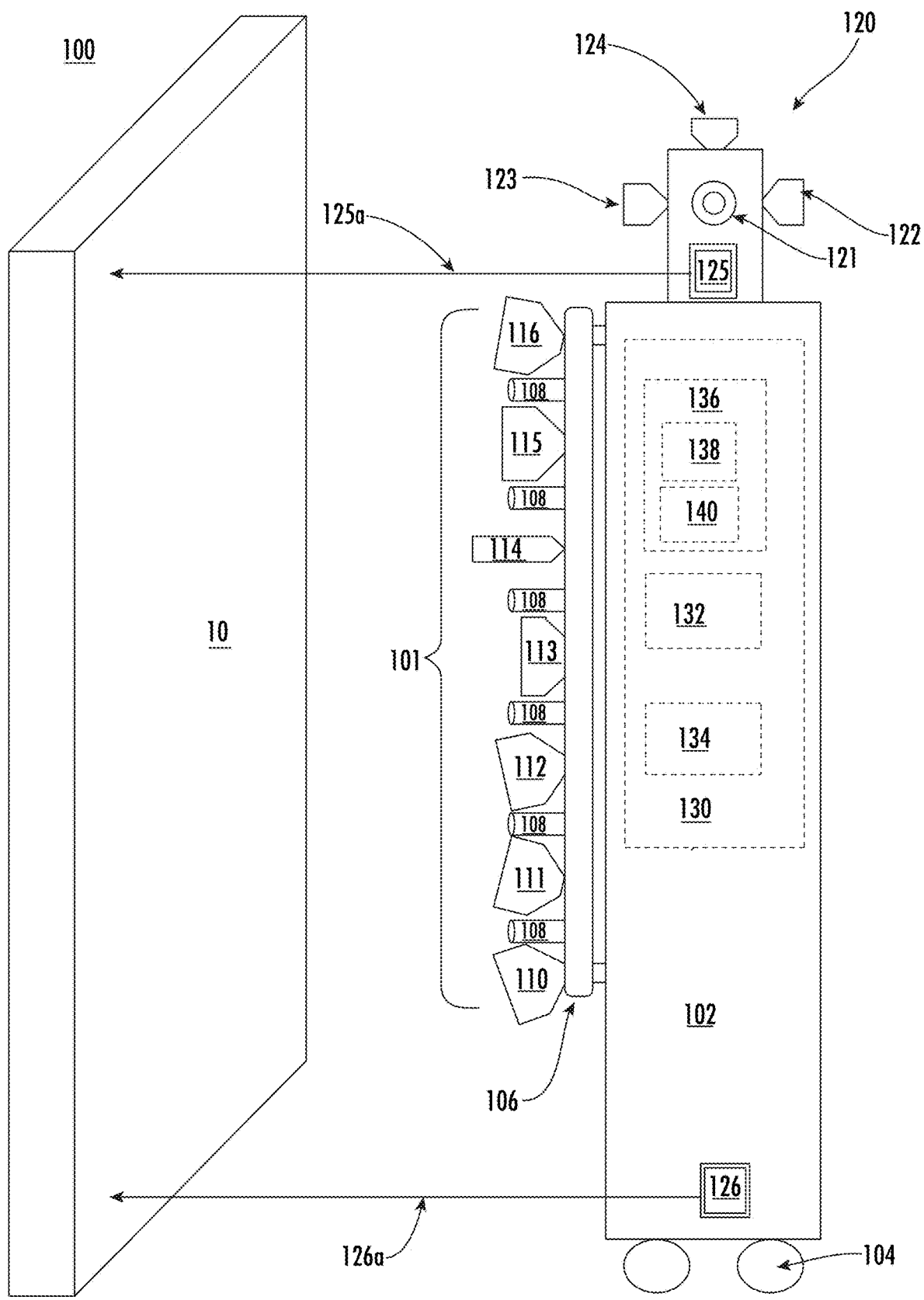
FIG. 1 is a block diagram of one embodiment of an autonomous robot acting as an inventory monitoring camera system.

A "planogram" is a list, diagram or map that shows how and where specific products are placed on fixtures (shelves or displays) within a store, including how many facings for each product (distinct rows of the product) and the quantity of each product that sits on the fixture. The planogram is typically manually created.

A "spread" is defined as group of identical product facings which has spread to encroach the space on the shelf of an adjacent product, where the space allocated to a product is delineated by the placement of the shelf labels.

A "plug" is defined as a mis-placed product, most likely cause by a customer picking the product and placing it back on the shelf in the wrong spot.

A "fixture", as used herein, is defined broadly to include any means of displaying a product, for example, a shelf on which products sit, a peg from which products hang, a pallet sitting on a floor, etc.

A "peg product" is a product displayed by hanging, usually underneath the price label. The products typically are hanging on a rod, often extending from a pegboard.

A "shelf-ready package" refers to a box or container, typically a cardboard container in which individual products are shipped, in which the individual products are displayed while in the container by placing the container on the shelf. Often, a portion of the container will be removed to reveal the individual products.

A "ghosted product" is a product whose image is blurry on the panoramic image.

DETAILED DESCRIPTION

The present invention is based on the collection of images showing the fixtures of a retail store and the products thereon. Preferably, shelf labels will be visible at some fixed position on the fixtures. Shelf labels define sections of the shelf as being reserved for specific products. Products on the fixtures may be associated with a shelf label and, as such, a determination is able to be made that a product is in-stock or out-of-stock. The placement of the shelf labels on the fixtures will aid the system of the present invention as it attempts to associate product facings on the fixtures with the shelf labels and to determine when products are out-of-stock. In addition, misplaced products may also be identified based on a comparison of their identity to the shelf label with which they are associated based on their placement on the shelf or peg.

The images required for analysis of the inventory of the store by the system of the present invention may be collected in any way. For example, the images may be collected manually by photographing sections of the shelves or from stationary or mobile cameras. However, in preferred embodiments of the invention, the images are collected autonomously by a mobile robot which navigates up and down the aisles of the store. In some embodiments, the images are then stitched together to form a panoramic image.

Collection of Images

The invention is described herein as being based on the analysis of "images" of aisles of products collected by "cameras". However, as would be realized by one of skill in the art, any representation of an aisle of products could be used. For example, the information required to implement the invention may be obtained from a 3D point cloud or from a planogram. Therefore, the use of the term "image" in the explanation of the invention should be interpreted broadly to include any possible representation. Additionally, the use of the term "camera" should also be interpreted broadly to include any type of sensor used to collect the required information, regardless of whether or not an actual "image" is produced by the sensor.

An example of such an autonomous robot acting as an inventory monitoring camera system 100 is shown in FIG. 1 in block form. A camera and optional lighting array 101 are mounted on movable base 102. Movable base 102 may be fitted with drive wheels 104 or may use other forms of locomotion well-known in the robotics field, such as tracks. Movable base 102 is intended to navigate through the aisles of the store to track the status of products on fixtures or other targets 10.

Movable base 102 can be an autonomous robot having a navigation and object sensing suite 120 that is capable of independently navigating and moving throughout a building, while avoiding obstacles, for example, customers. The autonomous robot preferably has multiple cameras 110 . . . 116 attached to movable base 102 by a vertically extending camera support 106. Optional lights 108 are positioned to direct light toward target 10. The object sensing suite may include forward (121), side (122 and 123), top (124) and/or rear (not shown) image and depth sensors to aid in object detection, localization, and navigation. Additional sensors such as laser ranging units 125 and 126 (and respective laser scanning beams 125a and 126a) also form a part of the sensor suite that is useful for accurate distance determination. In certain embodiments, image sensors can be depth sensors that infer depth from stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, 3D LIDARs, ultrasonic sensors, radar systems, magnetometers or the like can be used to aid in navigation. In still other embodiments, sensors capable of detecting electromagnetic, light, sound or other location beacons can be useful for precise positioning of the autonomous robot.

In some embodiments, the depth sensors are associated with image cameras and depth pixels registered to image pixels. This provides depth information for pixels in the image of the shelves. This depth information measures the distances of the image camera to the shelf lip and to the products. In some embodiments, moveable base 102 may also include, either exclusively or in addition to cameras, other types of sensors, for example RADAR, LIDAR, time of flight sensors, etc.

The camera and depth sensors may produce images rendered in RBD, RGB-D (RGB with depth information), grayscale or black and white. Grayscale may use only one of the R, or G or B channels to make a gray scale-D or a R-D or G-D or B-D. Any other color map transformation may be used, for example, RGB to Z, to make a Z-D map. The camera may render N-channel images having depth information, For example, RGB+YU+D.

In alternate embodiments, spatial depth change detection may be used in lieu of absolute depth measurements.

As seen in FIG. 1, various representative camera types useful for constructing an updatable map of product or inventory position may be used. Typically, one or more shelf units, for example, target 10 in FIG. 1, would be imaged by a diverse set of camera types, including downwardly (110 and 112) or upwardly (111 and 116) fixed focal length cameras that cover a defined field less than the whole of a target shelf unit, a variable focus camera 115 that adapts its focus to the distance from the imaged target; a wide field camera 113 to provide greater photographic coverage than the fixed focal length cameras; and a narrow field, zoomable telephoto 114 to capture bar codes, product identification numbers, and shelf labels. Alternatively, a high resolution, tilt controllable, height adjustable camera can be used to identify shelf labels. As may be realized, the actual number and type of cameras present in inventory monitoring camera system 100 may vary depending on several factors, including, for instance, the environment in which they are intended to operate.

To simplify image processing and provide accurate results, the multiple cameras 110 . . . 116 are typically positioned a set distance from the shelves during the image collection process. The shelves can be illuminated with LED or other directable lights 108 positioned on or near the cameras. The multiple cameras 110 . . . 116 can be linearly mounted in vertical, horizontal, or other suitable orientation on a camera support 106. According to some embodiments, both cameras 110 . . . 116 and lights 108 can be movably mounted. For example, hinged, rail, electromagnetic piston, or other suitable actuating mechanisms may be used to programmatically rotate, elevate, depress, oscillate, or laterally or vertically reposition cameras 110 . . . 116 or lights 108. In addition, camera support 106 may be movable either horizontally or vertically.

In some embodiments, to reduce costs, multiple cameras may be fixedly mounted on camera support 106. Such cameras can be arranged to point upward, downward, level, forward or backward with respect to the camera support and the shelves. This advantageously permits a reduction in glare from products having highly reflective surfaces, because multiple cameras pointed in slightly different directions are more likely to result in at least one image with little or no glare. Angling the camera aids in the avoidance of direct exposure to reflected light. Lights can be mounted along with, or separately from, the sensors, near to or far from the sensors. The lights may be angled forward, backward, upward, downward or level with respect to the light support and the fixtures and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light sources. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

Electronic control unit 130 contains an autonomous robot sensing and navigation control module 132 that manages robot movements and responses. Electronic control unit 130 may also be provided with communication module 134 which manages data input and output. Robot position localization may utilize external markers and fiducials or may rely solely on localization information provided by robot-mounted sensors. Sensors for position determination may include previously noted imaging, optical, ultrasonic SONAR, RADAR, LIDAR, time of flight, structured light, or other means of measuring distance between the robot and the environment, or incremental distance traveled by the mobile base, using techniques that include but are not limited to triangulation, visual flow, visual odometry wheel odometry and inertial measurements. In preferred embodiments of the invention, the movable base 102 will remain a constant distance from target 10 as movable base 102 traverses the aisles of the store.

Electronic control unit 130 may also provide image processing using a camera control and data processing module 136. The camera control and data processing module 136 can include a separate data storage module 138. Data storage model 138 may be, for example, a solid-state hard drive or other form of flash memory. Data storage model 138 is connected to a processing module 140. The communication module 134 is connected to the processing module 140 to transfer product availability and/or identification data or panoramic images to remote locations, including store servers or other supported camera systems, and optionally receive inventory information to aid in product identification and localization. In certain embodiments, data is primarily stored, and images are processed within the autonomous robot. Advantageously, this reduces data transfer requirements, and permits operation even when local or cloud servers are not available. In alternate embodiments, images may be stored and analyzed off-unit on a local server or cloud server.

The communication module 134 can include connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n/ac/ax) can be used as well as a separate 4G cellular connection.

Remote servers connectable to inventory monitoring camera system 100 can include, but are not limited to, servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In other embodiments the cameras are fixedly mounted to fixtures such as shelves or store infrastructure such as the ceiling. The cameras can optionally be equipped with a motion sensor. The cameras can capture images either continuously, for example at a rate of 10, 15, or 30 frames per second, or intermittently at a set time interval, or when triggered by motion detected by the onboard sensor.

The camera can further comprise an onboard processor to pre-process the images, for example to detect and blur human faces.

The camera further comprises a communication module that transmits the images to a local server or to a cloud server.

Figure 2:
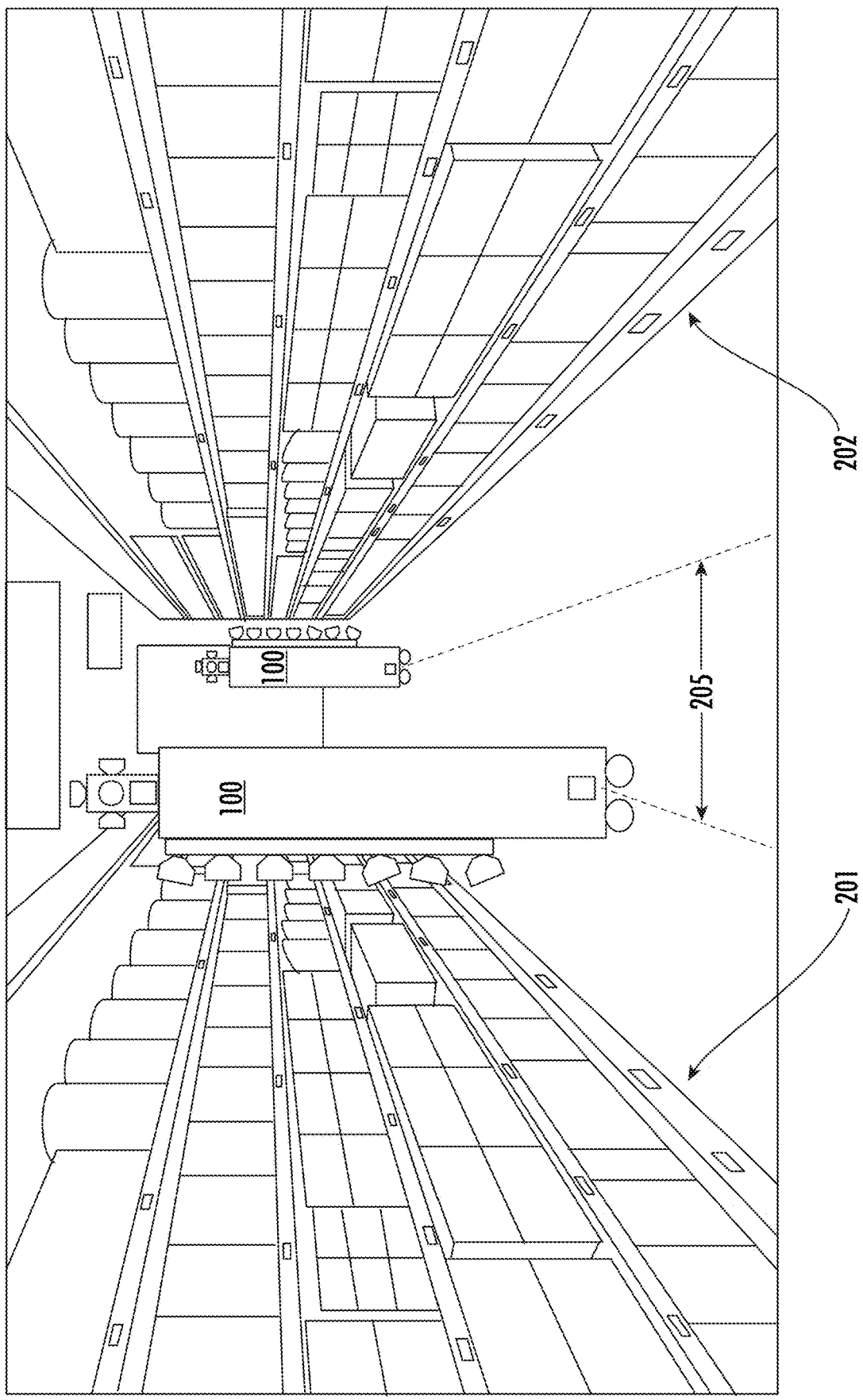
FIG. 2 is an illustration of two inventory monitoring camera systems of the type discussed with respect to FIG. 1 in situ in the aisle of a store.

FIG. 2 is an illustration of two inventory monitoring camera systems 100 of the type discussed with respect to FIG. 1. Inventory monitoring camera systems 100 are shown inspecting opposite shelves 201 and 202 in an aisle. As shown, each inventory monitoring camera system 100 follows path 205 along the length of an aisle, with multiple cameras capturing images of the shelves 201 and 202.

In some embodiments, the inventory monitoring camera systems 100 support at least one range finding sensor to measure distance between the multiple cameras and the shelves and products on shelves, with an accuracy of less than 5 cm, and with a typical accuracy range between about 5 cm and 1 mm. As will be appreciated, LIDAR or other range sensing instruments with similar accuracy can also be used in selected applications. Using absolute location sensors, relative distance measurements to the shelves, triangulation to a known landmark, conventional simultaneous localization and mapping (SLAM) methodologies, or relying on beacons positioned at known locations in a blueprint or a previously built map, the inventory monitoring camera systems 100 can move along a path generally parallel to shelves 201 and 202. As the movable bases 102 move, vertically positioned cameras are synchronized to simultaneously capture images of the shelves 201 or 202. In certain embodiments, a depth map of the shelves and products is created by measuring distances from the shelf cameras to the shelves and products over the length of the shelving unit using image depth sensors and/or laser ranging instrumentation. The depth map is registered onto the images captured by the shelf cameras, so as the location of each pixel on target can be estimated in 3D.

As can be seen from FIG. 1, each camera is intended to capture a particular vertical portion of the shelf fixture as movable base 102 traverses the aisle. The vertical portion of the shelf fixture maybe captured as one long panoramic image as movable base 102 continuously moves along the aisle, or, alternatively, the vertical portion of the shelf may be captured as a single image or as multiple vertical, overlapping images which may be obtained, for example, if the robot moves a certain distance and then stops to allow imaging of the portion of the shelves currently in front of the cameras. Alternatively, the robot may continuously capture images without stopping.

For each section of the shelf fixture, multiple images may be captured at varying focal lengths, such as to increase the likelihood of obtaining clear images of products at differing depths from the edge of the shelf. Images from cameras 110 . . . 116 may be horizontally and/or vertically stitched together to form a panoramic image needed for analysis of the product status. Using available information, for example, the location of each pixel on target images, consecutive images can be stitched together to create panoramic images that span an entire shelving unit along the entire length of the aisle. The consecutive images can be first stitched vertically among all the cameras, and then horizontally and incrementally stitched with each new consecutive set of vertical images as the inventory monitoring camera systems 100 move along an aisle. If multiple images have been captured for a given section of the aisle, the best image may be selected for inclusion in the stitched-together panoramic image. In this case, the best image may be an image having better focus than other images of the same section of shelf, or, for example, may be an image lacking lighting artifacts or reflections.

Figure 3:
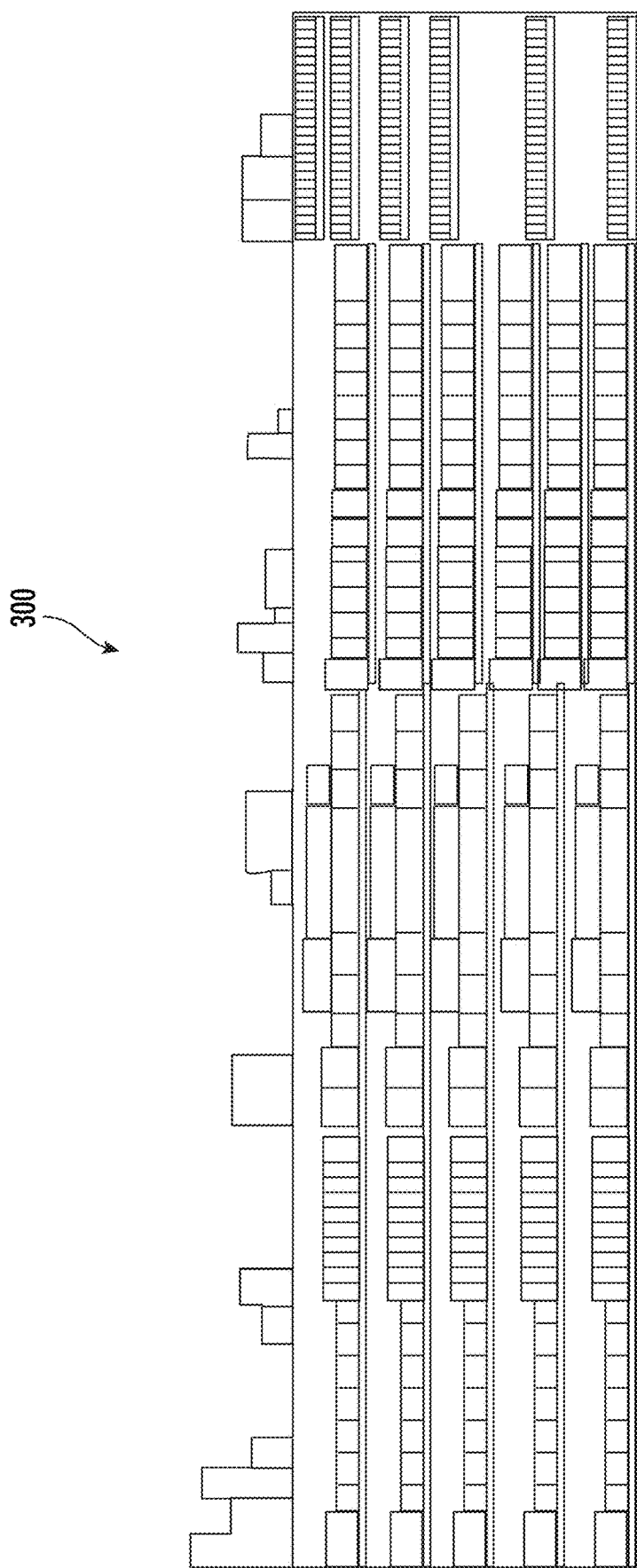
FIG. 3 is an example of panoramic image of the type used by the present invention.

Image processing to create or improve panoramic image construction can include keypoint detection to find correspondences between overlapping images, image registration using matching features or direct alignment, image calibration to compensate for differing lens and camera combinations, distortion, exposure, or chromatic aberration corrections, and image blending and compositing. Various map projections can be used for arranging stitched images, including rectilinear, cylindrical, equiangular, stereographic, or spherical projection An example of an image 300 is shown in FIG. 3. In preferred embodiments of the invention, one image 300 will be provided for each aisle in the store. The image 300 for each aisle may or may not include end caps. In certain embodiments, images of end caps may be provided as separate images. In preferred embodiments, image 300 is a panoramic image.

Processing Pipeline

The images 300 collected by inventory monitoring camera system 100 are processed by a processing pipeline which comprises a combination of deep learning detectors and classifiers, as well as logic, to extract the required information from the images. The goal of the pipeline is to detect and flag: (1) out-of-stock items (including products displayed in shelf-ready packages and peg products); (2) plugs; and (3) spreads. It is a further goal of the pipeline to determine shelf label location and content and to identify individual product facings. Additional, optional, goals may include, without limitation: a comparison of product locations to a planogram, classification of the fixture type (e.g., shelves, pegs, etc.), identification of constituent parts of the fixture such as the side counter, and caps, side caps, side stacks, etc., determining the beginning and end of each section of a shelf, and determining the state of the fixture such as broken shelves.

Figure 4:
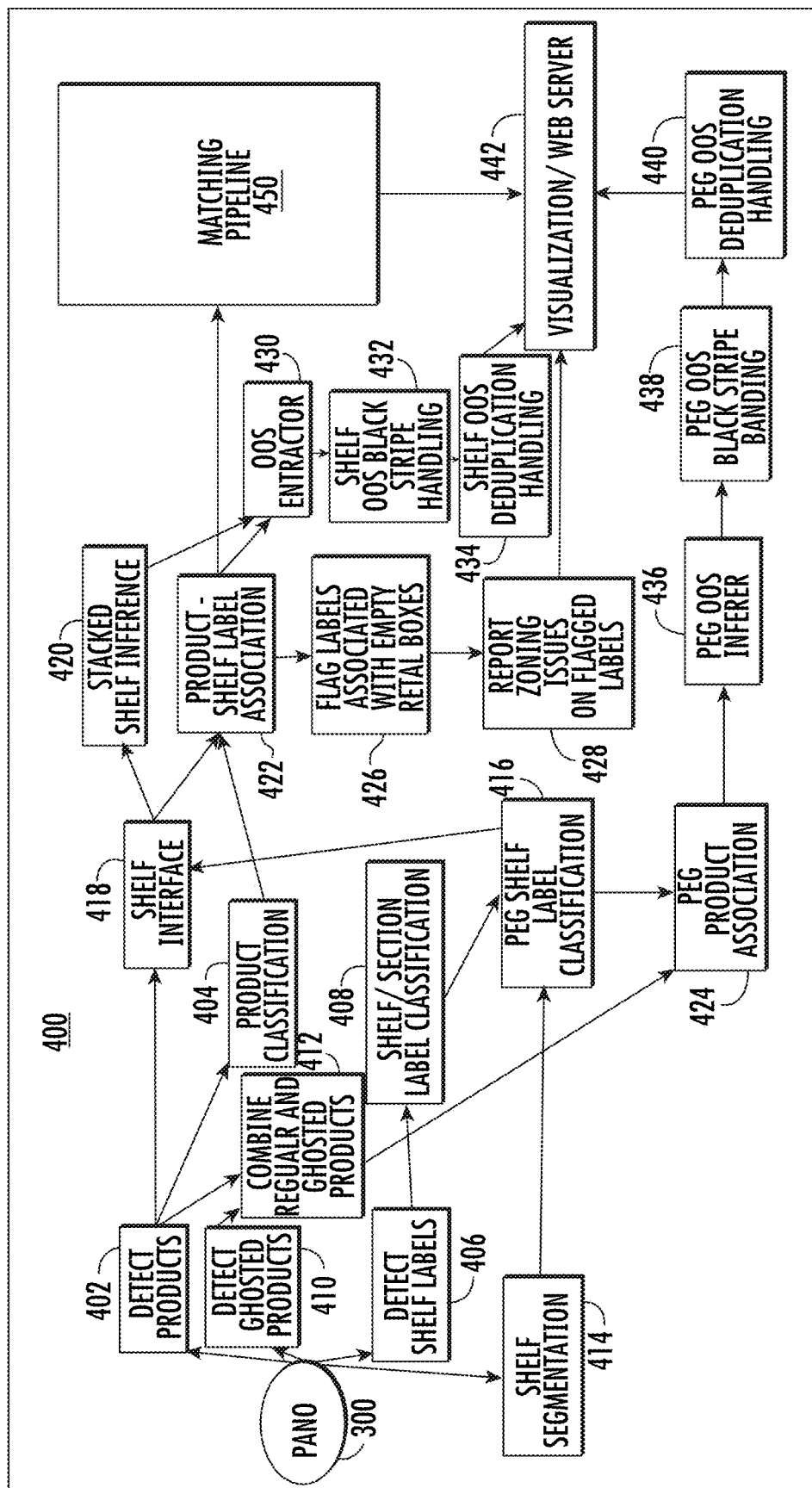
FIG. 4 is an exemplary processing pipeline used to process the panoramic images of the type shown in FIG. 3.

FIG. 4 shows one example of a processing pipeline 400 which may be used to process images 300 in accordance with the present invention. The process starts with image 300 of the form shown in FIG. 3. Preferably image 300 will comprise an image stitched together from individual, high resolution images captured by an inventory monitoring camera system 100 as shown in FIG. 1 and as described above. In some embodiments, image 300 may be of lesser resolution than the original images captured by inventory monitoring camera system 100.

Product detector 402, shown as a component of pipeline diagram 400 in FIG. 4, is a detector which operates on the panoramic image to detect products and place bounding boxes around the products. In current embodiments of the invention, several different types of products that are detected. These include (1) peg products, which are products are not actually on a shelf, but are hanging from pegs; (2) grill products, which are products which may be placed in a bin having as a front surface a metal grating through which products may be observed; (3) shelf products, which are products placed on the shelves; (4) shelf-ready packages, which are boxes containing the products typically comprising a cardboard box having a top portion that has been removed to transform the cardboard box into a tray. The tray is then placed directly on the shelf; (5) shelf lip products which are products on a shelf equipped with a transparent, translucent, or opaque lip that partially occludes the products or modifies its view; (6) unpackaged products; (7) stacked products; (8) flat products; (9) deformable or bagged products; (10) binned products, which are products that are contained in a bin, that have to be typically reached from the top opening of the bin, and that can typically be viewed from the top; (11) caged products, which are products that are contained in a wireframe cage; (12) pushed products, which are products pushed to the front of the shelf by a pushing fixture; and (13) guarded products, which are products guarded on each side by railing that ensures consistent alignment of the product with its corresponding shelf label.

Figure 5:
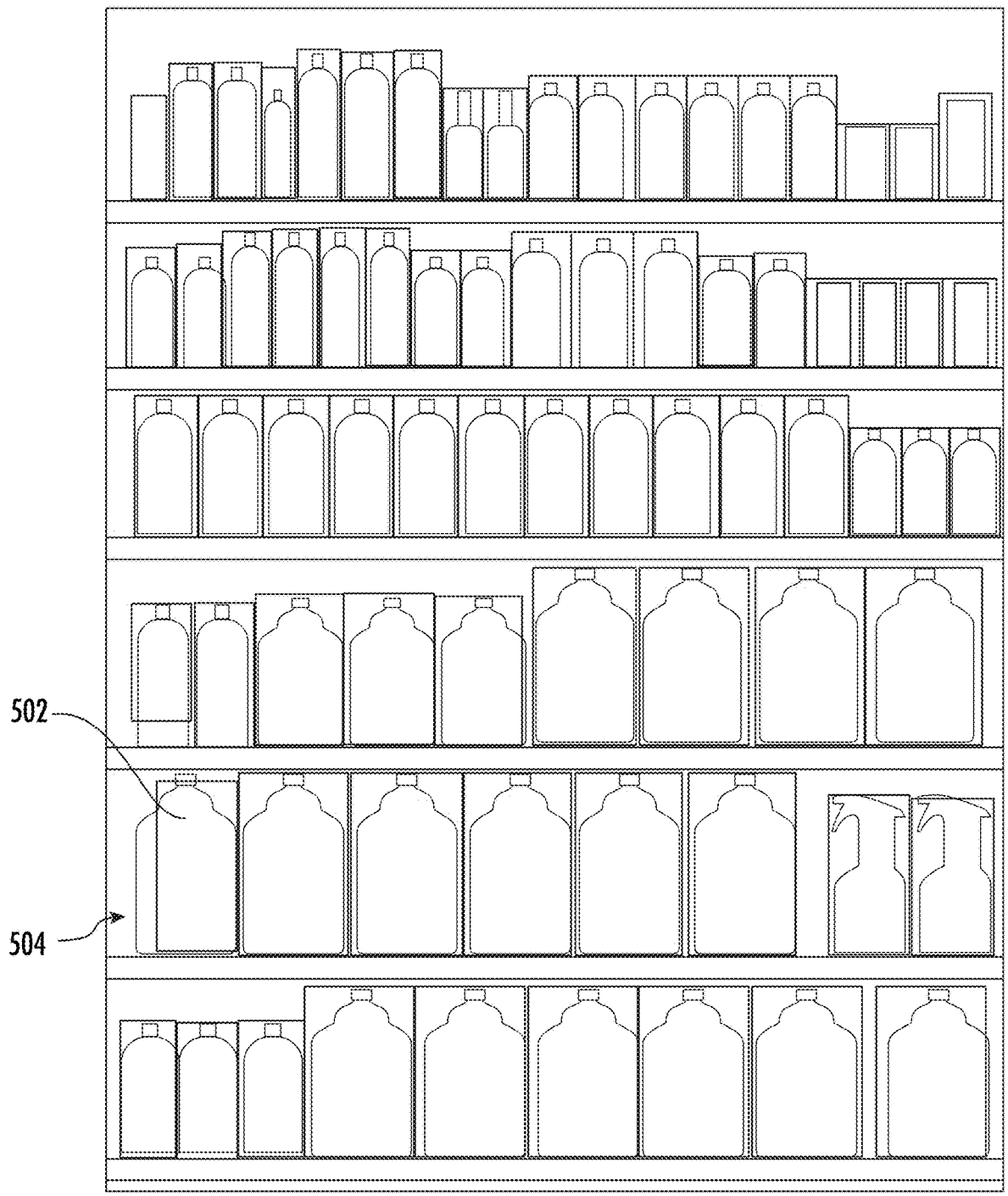
FIG. 5 is an example of the output of the product detector of the present invention showing products surrounded by bounding boxes.

FIG. 5 shows an example of a portion of the image 300 processed by product detector 402, showing bounding boxes 504 surrounding various products 502. It is contemplated that, in other embodiments of the invention, other types of products may be detected, either by using product detector 402 or by using another detector.

Product detector 402 produces, as an output, the image with a bounding box as shown in FIG. 5. In some embodiments, the bounding box is represented in a data structure as a tuple of data of the form BB={x, y, w, h}. A tuple may comprise, for example, the x,y coordinates of a corner of the bounding box as well as the width (w) and the height (h) of the bounding box. Other information may be included in the tuple, for example, depth information. In some embodiments, the tuple may represent bounding boxes within a 3D point cloud. The x,y coordinates of the bounding box may be relative to a coordinate system imposed on the image, having an arbitrary point of origin. In some embodiments of the invention, the incremental units within the coordinate system may be pixels.

In preferred embodiments, product detector 402 is a machine learning model trained on images of products. Any commonly-known architecture for the machine learning model may be used.

The number of available images for training product detector 402 is less than the typical number of images required to train a deep neural network. Further, each image, especially if it is panoramic image, may be too large to fit on a single GPU. The solution adopted for product detector 402 is random cropping of images with fixed window size so that each generated training batch is unique. This operation creates big variations from limited data, which allows the detector to generalize well to unseen images. An example of a cropped panoramic image is shown in FIG. 5.

Once products have been identified by product detector 402, the products are classified into one of the various types of products discussed above by product classifier 404. In certain embodiments, only a subset of the product types may be detected. FIG. 6 shows a two-tiered classifier architecture taking as an input an image of a product 602. Product image 602 may be extracted from the image 300 using the tuples defining the bounding boxes around the products as determined by product detector 402.

FIG. 6 shows the architecture of the product classifier 404. A first classifier 604 classifies products into one of the selected categories mentioned above, for example, identifying whether the incoming product image is one of: a peg product, a grill product, a shelf product or a shelf-ready package. If the output of the first model identifies the input image 602 as containing a shelf-ready package, then the input image 602 is forwarded to a second classifier 606, which checks to see if the shelf-ready package identified by classifier 604 is empty or not empty. Classifier 606 outputs a "0" if the shelf-ready package is empty, and "1" if the shelf-ready package is not empty.

In certain embodiments, products may be identified as peg products by other means. For example, a product may be determined to be a peg product if the product does not lie above or below a shelf, or, if the product lies in an area associated with a peg label.

Figure 7A:
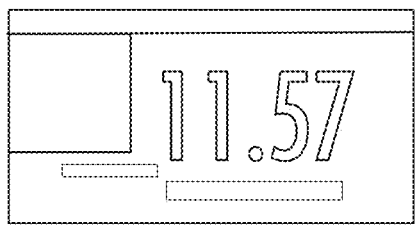
FIG. 7 is an example of the output of the label detector of the present invention showing shelf labels surrounded by bounding boxes.
Figure 7B:
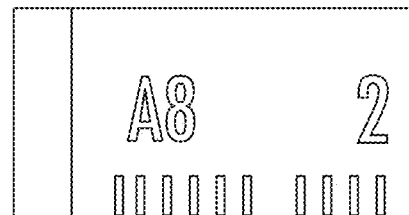
Figure 7C:
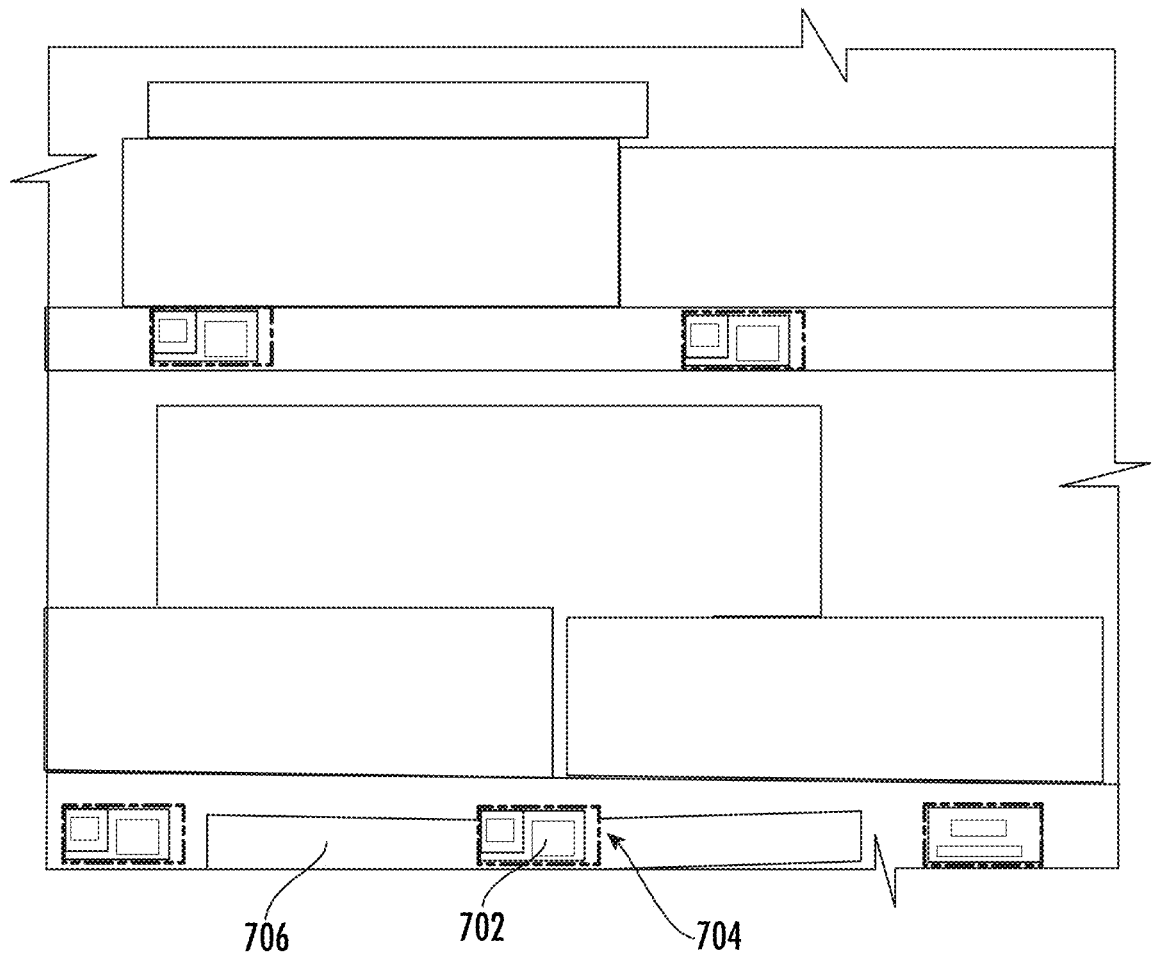

Shelf labels are detected in a similar manner using label detector 406, shown as a component of pipeline 400 in FIG. 4. Shelves in stores typically have two kinds of labels. The first type of label is a price label for the products, which are referred to herein as "shelf labels". An example of a shelf label is shown in View (A) of FIG. 7. The second type of label is a section label which marks the end of a section of shelving. An example of a section label is shown in View (B) of FIG. 7. Label detector 406 does not differentiate between the two types of labels but instead detects both types in a single forward pass on the input image 300. In some embodiments, label detector 406 may also detect promotional materials 806 placed along shelf edges. In preferred embodiments, label detector 406 is trained using images of labels. Label detector 406 will also output a tuple describing the x,y location of the label bounding box as well as the width (w) and height (h) of the bounding box. View (C) of FIG. 7 shows bounding box 704 placed around shelf label 702.

Because section labels and promotional materials are not typically associated with products, they must be removed from the pipeline. This is accomplished by training a classifier 408 to distinguish between shelf labels and section labels and promotional materials. The classifier takes as an input a label image, which can be cropped from the image 300 using the bounding box coordinates generated by label detector 406 and classifies it as a shelf label or not a shelf label. Those labels which are not shelf labels are then ignored for the remainder of pipeline 400.

A "ghosted product" is a product whose image is out of focus or blurry on the image. As such, the product may not be able to be detected by the product detector 402. The image of the product may be blurry because of one or more of several possible reasons. First, not all products may be at the same depth from the camera. For instance, the camera may be focused to take images at the edge or near edge of each shelf, while the actual products are sitting further back on the shelf because products near the edge of the shelf have been removed by customers. Additionally, products that are displayed on pegs are often at a depth different from the products on the shelves. That is, the pegs are not as long as the shelves and as such, the products may be farther away from the camera. As such, the image of the product in image 300 may be blurry. In addition, the stitching process which creates image 300 from the horizontal and vertical stitching of individual images of the shelves may leave some products blurry as an artifact of the of the process, especially where the products may appear near the edges of each image being stitched together.

Box 410 of the processing pipeline 400 shown in FIG. 4 is a special detector that has been trained to detect ghosted products and to enclose them in a bounding box. As with the product detector in box 402, the ghosted products detector 410 will output a tuple describing the bounding box, having x,y coordinates as well as the width (w) and the height (h) of the bounding box. Ghosted products detector 410 is preferably trained using ghosted data from peg regions of the store aisles. At box 412 of processing pipeline 400, the detected products are combined with the ghosted products to produce a list of the location of all bounding boxes representing products within image 300. The combined listing of products and ghosted products, in some embodiments, may simply be a list of all tuples produced by the product detector 402 and the ghosted product detector 410.

Figure 8:
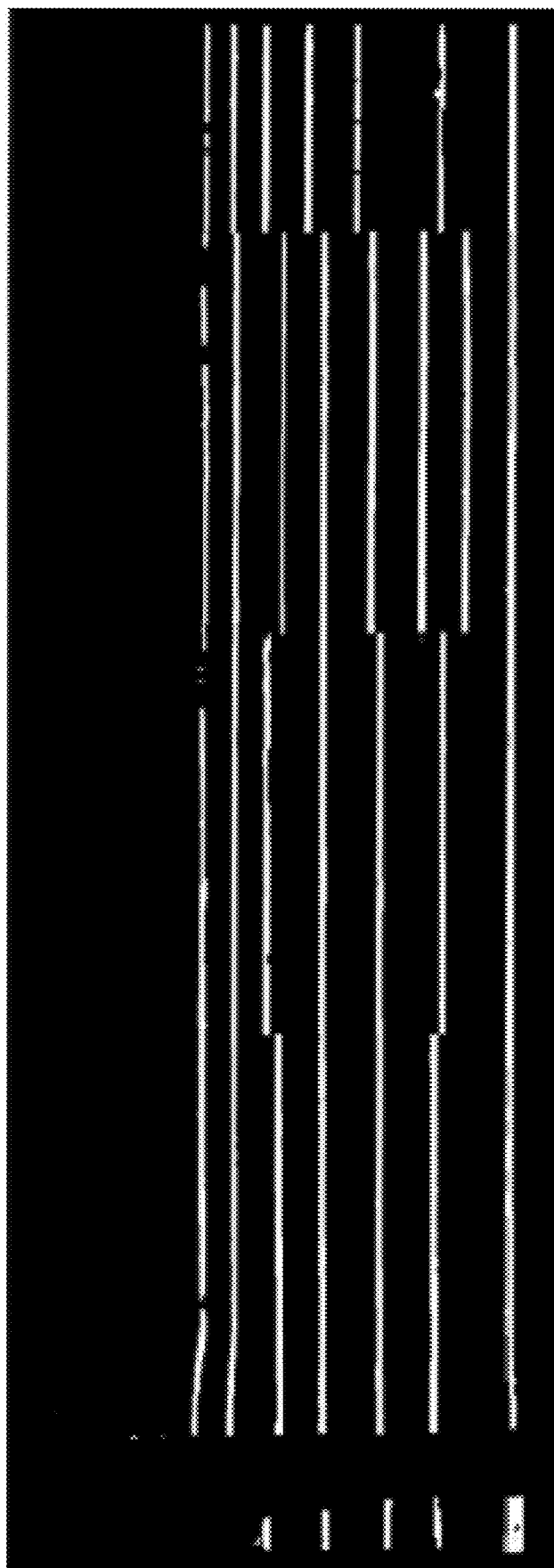
FIG. 8 is an example of the output of the shelf segment classifier of the present invention, showing a binary mask having highlighted areas indicating which pixels in the panoramic image are located on a shelf.

As part of the process of identifying pegged products, is necessary to identify where shelves are located on image 300. At box 414 of pipeline 400, the image 300 is processed by a classifier 414 that classifies each pixel of the image 300 determine if the pixel is part of a shelf or not part of a shelf, to produce a binary mask, having pixels located on shelves flagged as a binary "1" in pixels not located on shelves flagged as a binary "0". This results in a binary mask, an example of which shown in FIG. 8. A smoothing operation may be applied to the binary mask to smooth the edges of the shelves and merge any breaks in the shelf. The mask in FIG. 8 is the result of processing the image of FIG. 3 with the shelf segment classifier 414.

The binary mask showing the location of the shelves may be used to determine which of the shelf labels identified by shelf/section label classifier 408 are shelf labels representing product sitting on a shelf or are peg labels representing products hanging from a peg. It is assumed that if a shelf label has a location which overlaps the areas of the binary mask showing the locations of the shelves, then the shelf labels associated with the product sitting on a shelf. Likewise, if the shelf label has a location which does not overlap the areas of the binary mastering location of the shelves in the shelf labels assumed to be associated with the product hanging from a peg. Peg shelf label classifier 416 makes this determination.

Figure 9:
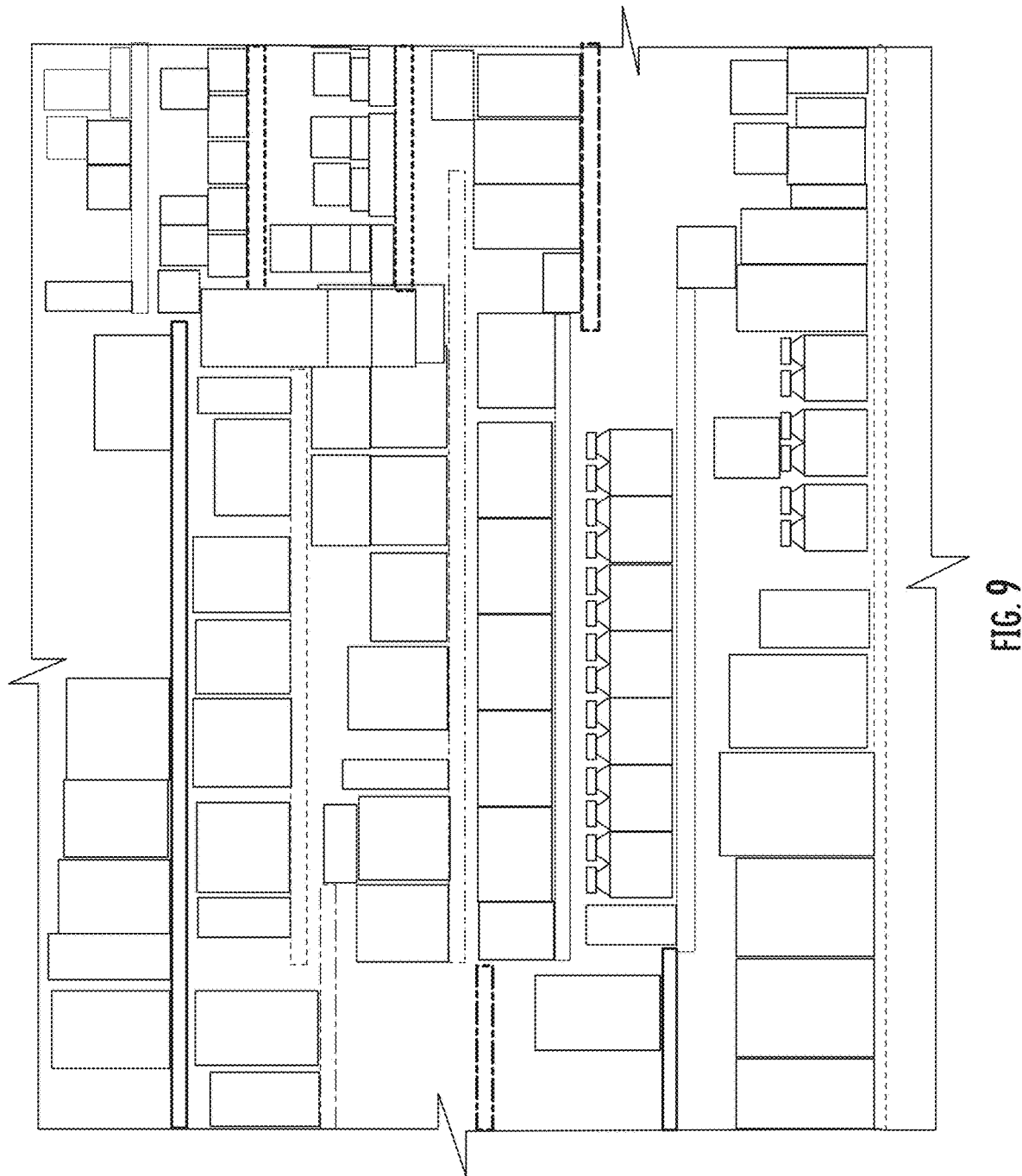
FIG. 9 shows the output of the shelf inference logic, showing bounding boxes around shelves.

In alternate embodiments of the invention, shelves may also be localized by inferring the location of the shelves from the location of the shelf labels, in box 418 of pipeline 400. It is assumed that if shelf labels are aligned in a horizontal line, as specified by their x,y coordinates (discovered by shelf label detector 406), then the shelf labels all lie on a shelf. As such, the presence and dimensions of the shelf can be inferred from the alignment of the shelf labels. In some embodiments of the invention, the output of the shelf segment classifier 414 may also be an input to shelf inference 418. Once it is determined where the shelf is located, a shelf tuple is created defining a bounding box for the shelf. An example of bounding boxes for shelves is shown in FIG. 9.

Once a location of a shelf is inferred, it is also possible to determine which product bounding boxes, discovered by product detector 402, are positioned on the shelf by comparing the location of the bottom of the products bounding box with the location of the top of the shelves bounding box. The output of shelf inference 418 is a shelf object comprising the location of the shelf, all shelf label tuples associated with the shelf and all product tuples for product bounding boxes located on the shelf.

In the image 300, there may be some shelves which are thicker in the vertical direction than other shelves. Such shelves, referred to herein as "stacked shelves", may have two rows of labels as opposed to one row. In this case, the top row of labels are for products above the shelf and the bottom row of labels is for products below the shelf, which, in some instances, may be sitting on the floor of the aisle. An example of a stacked shelf is shown by reference number 1002 in FIG. 10. The stacked shelves are also inferred in box 420 of pipeline 400.

The next step in the pipeline is to associate products on the shelves with the respective labels on the shelf edges by product/shelf label association at box 422 of pipeline 400. This is a crucial prerequisite for the detection of out-of-stock products, spreads and plugs. In this step, the products are associated to their respective labels. All products between two neighboring labels, or between a label and shelf end, will be associated to the label on the left (in a left justified configuration).

Figure 11:
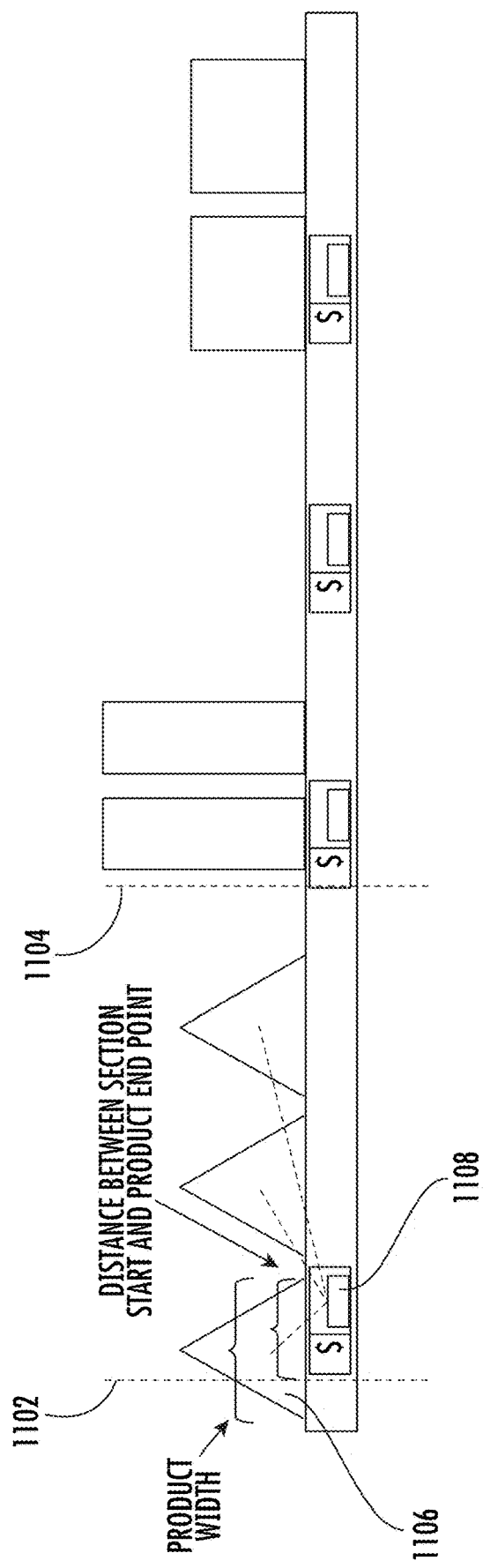
FIG. 11 is a schematic representation of the process used to determine product/shelf label association when the products are not completely within the section of a shelf allocated to a specific shelf label.

On each shelf, a section is marked between the starting coordinates of two neighboring labels along the x-axis. These are referred to as section start points and section end points respectively. In a configuration where the products are left justified with the labels, a "section" would be defined as the area between the left edge of a label and the left edge of the next label to the right. All products falling within this section are associated with the shelf label at the far left of the section. As may be realized by one of skill in the art, in store configurations where the labels are right or center justified, the definitions of the sections and, as a result, the method of determining the product/label associations would be similar, but slightly different. For example, any vertical coordinate of the shelf label may be used to define the section, (area associated with the shelf label) and may include an offset, which may be different for adjacent shelf labels, or which may be 0. An example of a left justified section is shown in FIG. 11 as area between lines 1102 and 1104.

An "overlap ratio" is computed for every product within the selected section. If the overlap ratio is above some predefined threshold, then the product gets associated with the label in the selected section. This is illustrated in FIG. 11 wherein the section under consideration is between the line labeled 1102 and the line labeled 1104. The overlap ratio may be given by the following formula:

$$\text{overlap ratio} = \frac{\text{distance between section start point and product end point}}{\text{product width}}$$

Figure 10:
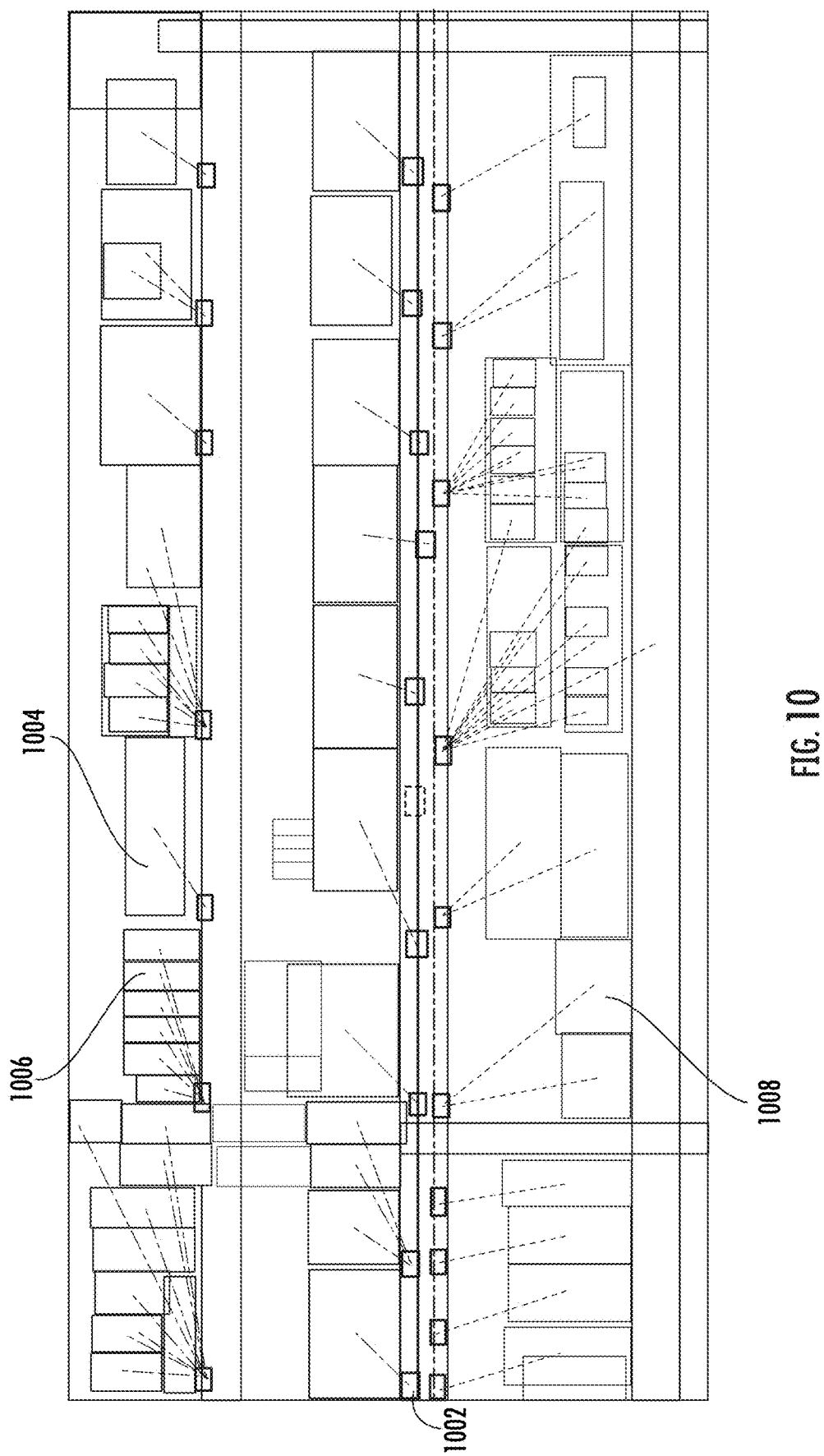
FIG. 10 shows the association between products and shelf labels.

In preferred embodiments of the invention, the predefined threshold may be 50%. As can be seen in FIG. 11, product 1106 has been associated with label 1108 because more than 50% of the product lies within the section defined by lines 1102 and 1104. Once all of the products within the selected section are associated, the next section is selected by moving between the next pair of labels on the shelf. The result of the product/shelf label association is shown in FIG. 10 showing which products are associated with which labels. Note that products having shelf ready packaging are detected as a single product, as shown by reference number 1004, while products stacked individually on the shelf are detected as individual products as shown by reference number 1006. Also note that products stacked below a shelf which has been determined to be a "stacked shelf" are associated with labels on the shelf above, as shown by reference number 1008. Logically, the output of box 422 is a dictionary in which tuples representing shelf labels are associated with tuples representing the products within the label section. It should be noted that in an out-of-stock situation, the tuple representing the shelf label will not have any product tuples associated therewith.

Box 424 of pipeline 400 creates the association between labels which have been classified as peg labels and the products associated therewith. This is done simply by associating any products directly below the peg label with the peg label. In additional, products left or right adjacent to the peg label not having a peg label immediately above may be associated as well. The peg label tuples and their associated product tuples are then added to the dictionary created by the product/shelf label association in box 422. This may be accomplished, for example, by determining that the centerline of a bounding box defining the product lies within the horizontal bounds of the bounding box for the peg label. Other criteria may be used to make this determination.

In box 426 of pipeline 400, those shelf labels which are associated with empty shelf-ready packages are flagged. The empty shelf-ready packages were discovered as part of the two-step classification in FIG. 6 wherein classifier 604 classifies a product as a shelf-ready package and classifier 606 classifies the shelf-ready package as being empty or not empty. An empty shelf-ready package does not necessarily imply that the product normally present in the shelf-ready package is out-of-stock. Often, an empty shelf-ready package at the edge of a shelf will have full shelf-ready packages behind the empty shelf-ready package. However, the system may not be able to detect this situation or may interpret the full shelf-ready packages as ghosted products, based on their depth on the shelf. As a result, the empty shelf-ready packages are flagged, as attention is still required by the staff of the store to remove the empty shelf-ready package and reposition the full shelf-ready packages to the edge of the shelf. At box 428 of pipeline 400, this situation is reported to the store.

At box 430 in pipeline 400, it is determined which shelf products are out-of-stock. This happens by consulting the dictionary of shelf label tuples and associated product tuples and determining which shelf label tuples have no associated product tuples. That is, which shelf labels have no products associated therewith. These shelf labels are extracted from the dictionary and placed in a separate out-of-stock list for further processing and eventual reporting to store.

In a manner similar to box 422, at box 436, it is determined if products which have been classified as peg products are out-of-stock. In box 424, the peg labels were associated with peg products. In box 436, those peg label tuples in the dictionary having no associated product tuples (i.e., no products positioned directly under the peg label) are extracted from the dictionary and added to the out-of-stock list.

At box 432 of pipeline 400 a special situation is handled in which a portion of the image 300 is blocked out. This could happen for instance, where the robot is traversing the aisle and comes upon an object (e.g., a person or shopping cart) next to the shelf. In such instances, the robot will navigate around the object but no images of the shelf behind the object are able to be collected. As such, in the image 300, this area of the shelf will appear as an occluded area showing black pixels. This can lead to false reporting of out-of-stock items, as in the situation wherein a label may be visible in image 300, but the section associated with that label is partially within the occluded area of the shelf. In such situations, it may be preferable to ignore the shelf label during the current pass of the robot as opposed to falsely flagging the product as being out-of-stock. As such, in certain embodiments of the invention, the shelf labels found to be in this situation may be removed from the out-of-stock list. At box 438, a similar process detects occluded areas with respect to product labels which have been classified as peg product labels.

At box 434 of pipeline 400 another special situation is handled. In this situation, the stitching process may create an artifact wherein the shelf appears twice within image 300, with one image of the shelf being directly below the other image of the shelf. In such situations, the products on the shelf will be associated with the shelf labels in the top image of the shelf. As such, the shelf labels in the bottom image of the shelf are ignored. At box 440, similar process detects duplicated peg product labels.

The depth information from the depth sensors can be used in two ways. The first way is to complement the out-of-stock pipeline, by confirming the absence of a product. This is done by measuring the distance between the shelf lip and the product above it, and if that distance is equal to the distance to the back of the shelf, the product is determined to be absent. This information can be combined to the out-of-stock logic in the pipeline to avoid reporting out of stocks in cases when the product detector would have not detected an existing product.

The second way that the depth information can be used is to way to create N-channel images, for example, RGB-D, by adding depth information D. For example, RGB+YU+D images may be created. CNNs, other types of neural networks, machine learning classification or AI algorithms may then be trained on the N-channel images to capture the 3D and other features in addition to the conventional 2D features. Using the N-channel images, out-of-stock products, plugs and spreads detection substantially follows the same described pipeline except that all images are N-channel instead of just RGB.

Figure 13:
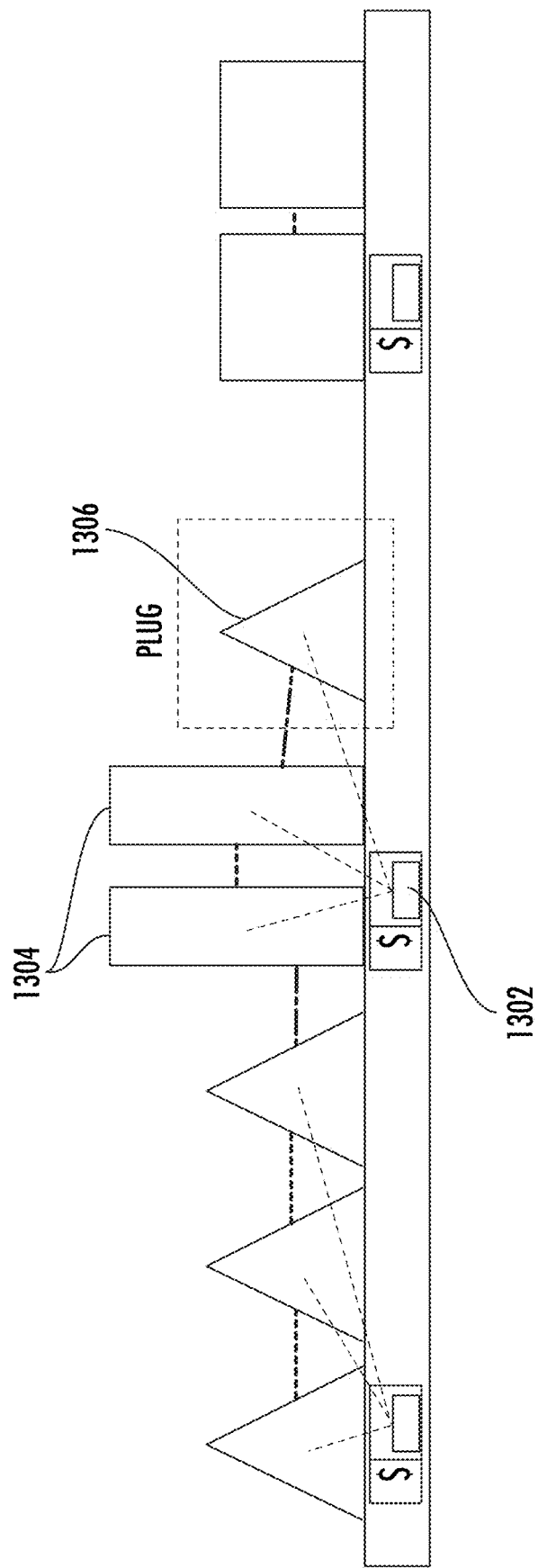
FIG. 13 is a schematic diagram showing a plug.

Matching pipeline 450 of pipeline 400 is used in the detection of plugs and spreads. FIG. 13 shows a plug situation. Products 1304 are associated with label 1302. However, product 1306 is in the shelf section that should only be populated by products 1304. Product 1306 is therefore a plug.

Figure 15:
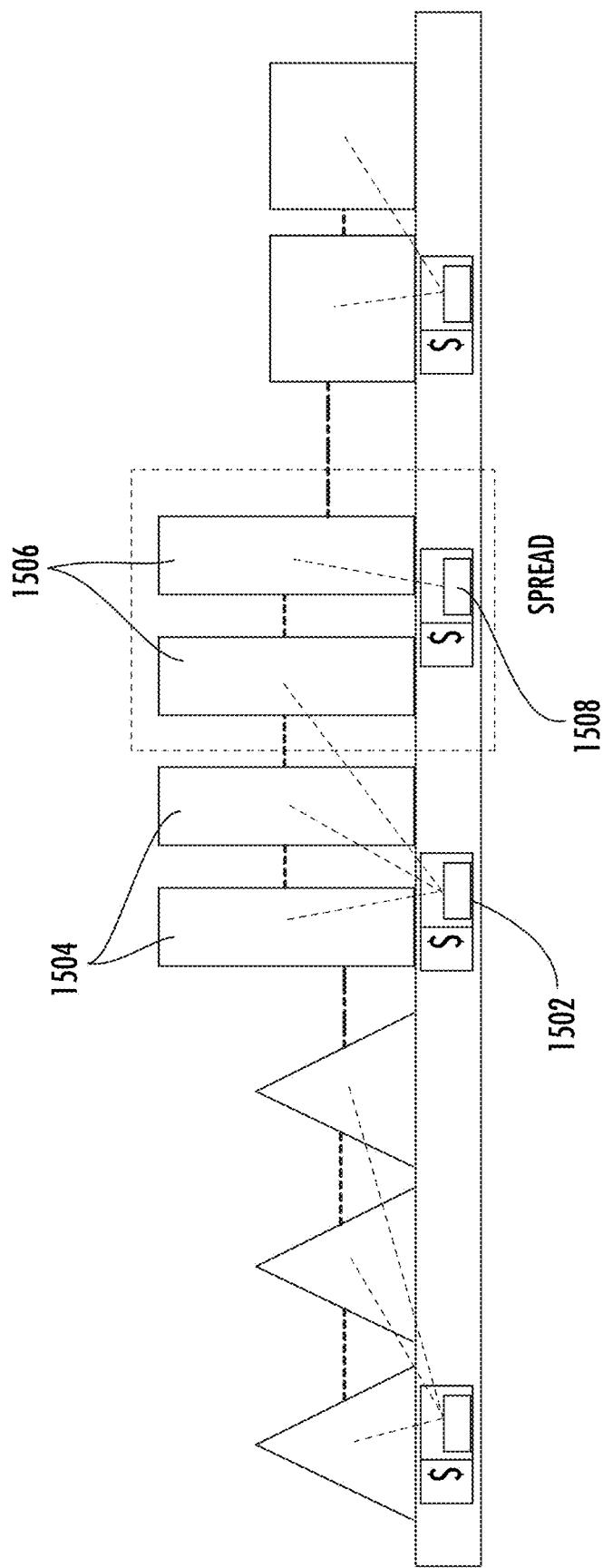
FIG. 15 is a schematic diagram showing a spread.

FIG. 15 shows a spread situation. Products 1504 are associated with label 1502. However, products 1506 are identical products 1504 and, as such, should occupy the section of the shelf between label 1502 and 1508. Instead, product 1506 are infringing on the section of the shelf associated with label 1508.

To detect plugs and spreads, it is necessary to determine if one product on the shelf matches another product. For example, in FIG. 13, if products 1304 do not match product 1306, and product 1306 is in the section of the shelf allocated to label 1302, then a plug has been detected. Likewise, in FIG. 15, if products 1504 match products 1506, then a spread has been detected.

Figure 12:
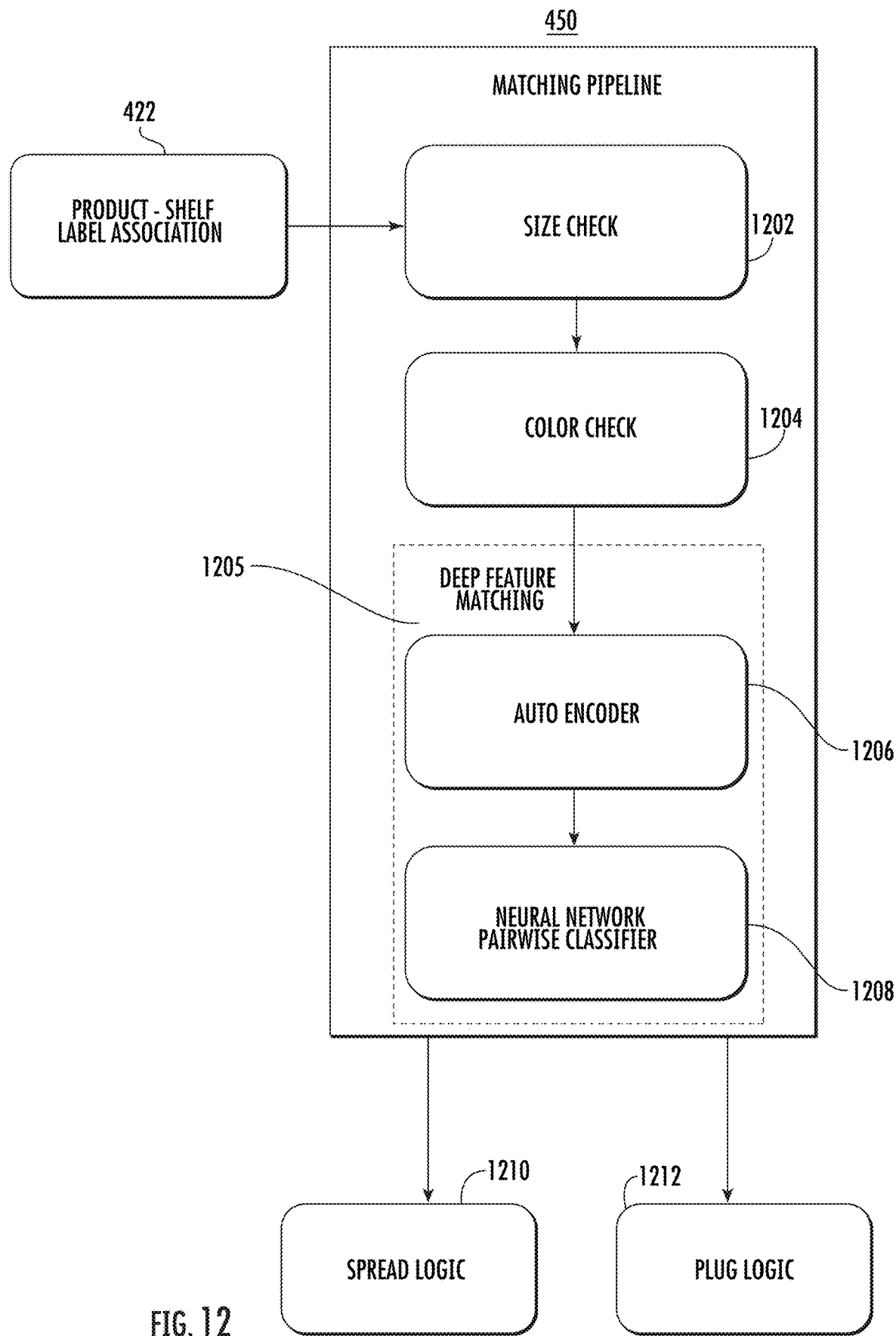
FIG. 12 is a diagram showing an exemplary matching pipeline for determining a pairwise match between adjacent products on a shelf for purposes of detecting plugs and spreads.

In one embodiment of the invention, a pairwise matching process is undertaken to determine if products next to each other on shelves match each other. In this embodiment, the purpose of matching pipeline 450 is to determine if one product matches an adjacent product. A more detailed version of the matching pipeline 450 is shown in FIG. 12. Two preliminary checks are first performed to identify products that match or do not match by doing a size check and a color check.

In box 1202 a size check is performed. In this check, each product on the shelf is checked with the product to its immediate right (in a left justified configuration) to determine if the products are the same size. If any difference in the size of each product in the pair of products falls within a certain predefined range, then it is determined that the products are the same size and as such may be may possibly be the same product. For example, if the predefined range is five pixels, then if the size of the products falls within five pixels of each other it is determined that they are of the same size. If the size check falls outside of the predefined range, then it is determined that the products are not the same size and, as such, are definitely different products. In this case, no further processing is performed by matching pipeline 450 for this pair of products.

In some embodiments, the range is a function of the camera's distance to the product. This distance can be measured by depth sensors coupled to the cameras, wherein each depth pixel is registered to a pixel in the color camera. If the products are measured to be at a different distance from the camera, then the range is adjusted accordingly.

If it is determined that the products are the same size, then an analysis of the color distribution of the product is performed in box 1204. The analysis of color distribution could be performed in one of several ways. For instance, in one embodiment, the average color of all the pixels may be ascertained to determine a match. In other embodiments, patch-wise matching may be performed. In yet other embodiments, a histogram of the color distribution may be obtained and compared with the histogram of the other product in the pair. If it is determined that the color distribution of the products does not match, then it is determined that the products are different, and the processing of that pair of products in the matching pipeline 450 ends.

If it is determined that both the size and color distribution of adjacent products indicate a match, as determined by boxes 1202 and 1204 respectively, the pair of products is next sent to deep feature matching 1205. In one embodiment of the invention, deep feature matching takes images of two products and feeds them to a deep learning CNN, which determines if the images match or do not match. In another embodiment of the invention, features may be extracted from the images and feature-wise matching may be done by a deep learning CNN. In another embodiment of the invention an additional deep learning CNN may be used to perform optical character recognition (OCR) of any writing on the front of the products to determine if the products match.

Auto encoder 1206 can involve use of deep models where deep features are learned from the images and matched. In auto encoder 1206, embeddings for each of the images are learned and followed with training a pair-wise deep classifier 1208 on the autoencoder features. The pair-wise classifier 1208 provides a decision of "1" if the pair of images match and "0" if they don't.

In alternate embodiments of the invention, deep learning neural network classifiers may be used to directly identify the product from an image of the product. The deep learning neural network classifiers may operate on images of the products extracted from image 300 or may operate on higher resolution images originally captured by inventory monitoring camera system 100 and used to form image 300.

The output of the matching pipeline is then sent to spread logic 1210, which is used to detect spreads, and plug logic 1212, which is used to detect plugs, as described below.

Figure 14:
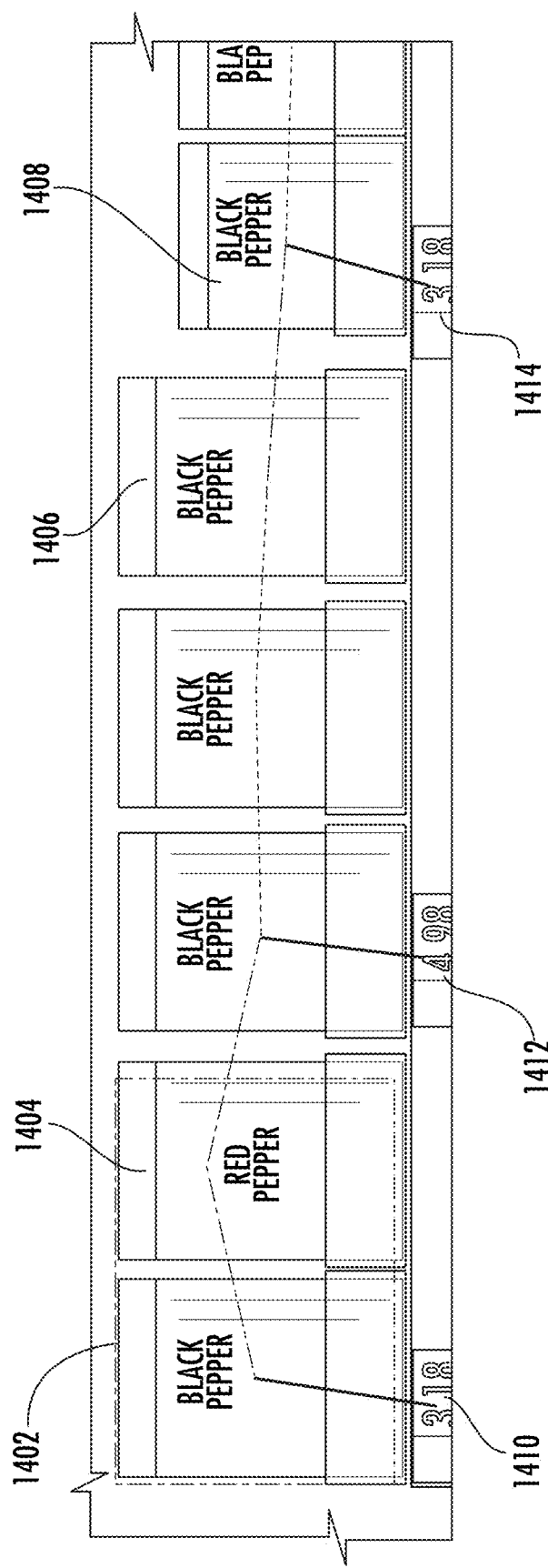
FIG. 14 shows the output of the matching pipeline and the output of the plug detector.

FIG. 14 shows a situation in which a plug has been detected. Two adjacent products are determined not to match, as shown by the red line between the products. Specifically, is determined at product 1402 and 1404 do not match each other and that product 1406 and 1408 also do not match each other. Because products 1402 and 1404 both reside in the shelf section associated with label 1410, a plug situation has been detected as indicated by the red box around products 1402 and 1404. Although products 1406 and 1408 also do not match, because product 1406 is within the shelf section associated with label 1412 and product 1408 is within the shelf section associated with label 1414, no plug situation is indicated.

Figure 16:
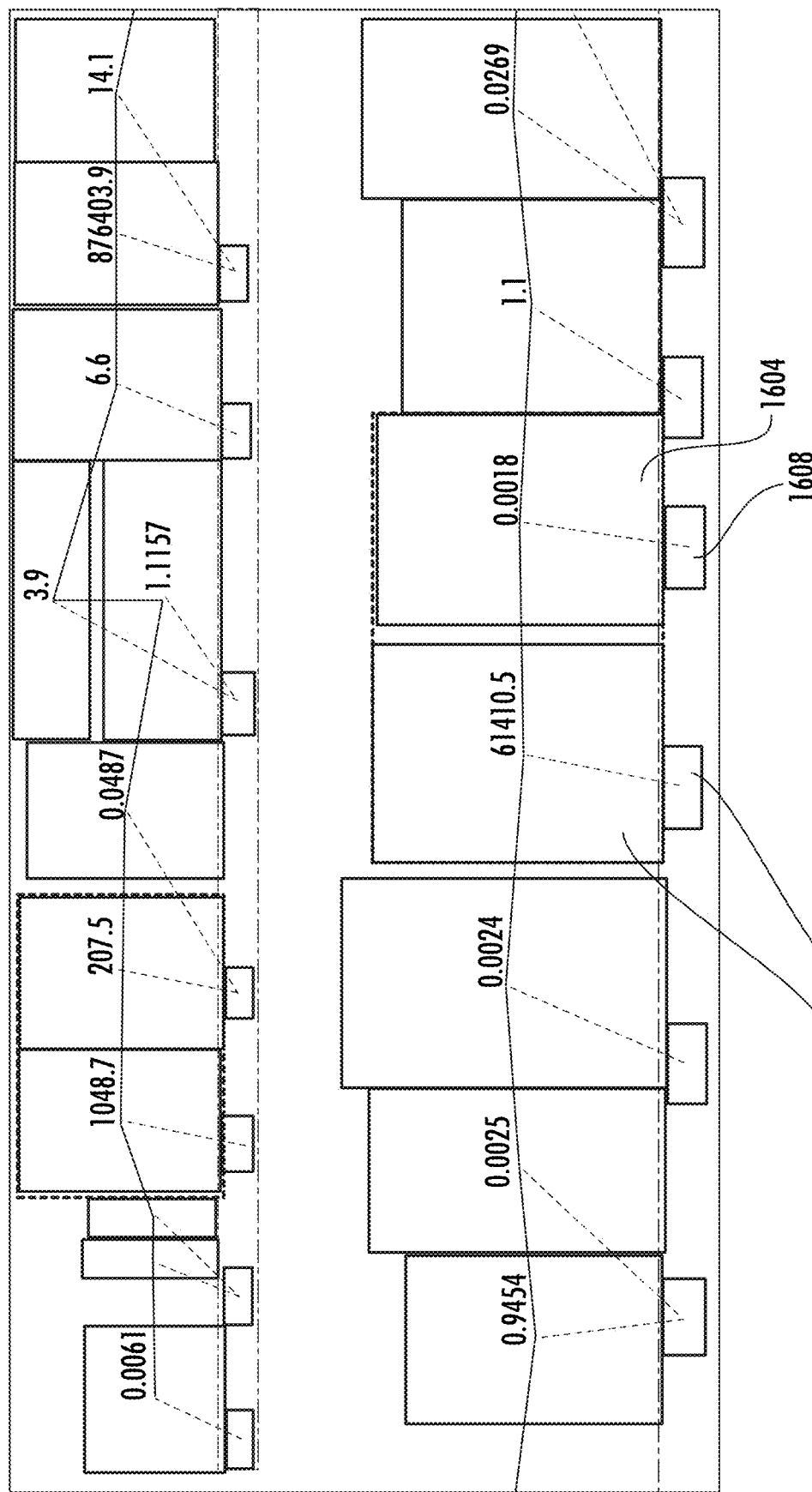
FIG. 16 shows the output of the matching pipeline in the output of the spread detector.

FIG. 16 shows a situation in which a spread has been detected. It is been determined that product 1602 and 1604 match each other and, as such, should be in the same section of the shelf associated with shelf label 1606. However, product 1604 is mostly within the shelf section associated with shelf label 1608 and, as such, is associated with shelf label 1608 in the dictionary. Because product 1604 should have been associated with shelf label 1606, it is determined that a spread has been detected, as indicated by the yellow box in FIG. 16.

Also, it should be noted that if no other products are associated with shelf label 1608, shelf label 1608 may be flagged as an out of stock product.

In another embodiment of the invention, misplaced products can be detected by positively identifying each product on the shelf and determining if it is in the correct section of the shelf. If a misplaced product is discovered, the plug and spread logic can be applied to determine if the misplaced product is a plug or a spread.

However, product recognition is a challenging problem. First, products can look very similar and yet be entirely different products. Further, the same product can look very different under different conditions, for example, pose variations (e.g., the same product viewed from different angles) or changes in packaging of the product can make identification difficult. Manufacturers may make different packages for the same product for a different time of year or different region of the country. Lastly, new products are constantly being released (e.g., seasonal products) for which there are no (or few) visual references available to train classifiers.

In this embodiment, a solution is described that improves automated out of stock detection accuracy. The solution relies on recognizing the presence of misplaced products for each product location. The solution benefits from artificial intelligence to learn what a specific product or line of products looks like and determines if other products are present in the shelf area reserved for a particular product. The solution further identifies the misplaced products as plugs or spreads.

One aspect of this embodiment of the invention involves the creation of a product library through a supervised or unsupervised training process. The product library can be used for a matching process through a machine learning-based product recognition framework to recognize products from an acquisition image, for example, a panoramic image 300, with various representations of the products and to determine if the products are placed correctly on the shelf.

In some aspects of this embodiment, the product library may be initiated, expanded, and optimized automatically. The product library can further be deployed into a product recognition and detection process that significantly improves the accuracy of out-of-stock detection. Therefore, this embodiment includes a method to build a product image library and train a feature extractor with continuously improved accuracy for matching product images with product identification.

In a first step of the method, source images (ground-truth images) of the products are acquired in digital form. The source images may be a standard image of a product provided by the manufacturer with a designated product identification or an image available from any other sources, including, but not limited to, a planogram of a store shelf with multiple products. The product identification may be any digital category information of products that may or may not be represented on the label that is associated with the product images. In preferred embodiments of the invention, the product identification is a UPC code. The product identification is referred to herein as a "prime ID".

In a second step of the method an acquisition image is acquired. The acquisition image may comprise, for example, an image captured from a retail store environment of products which may include, but not be limited to, images captured by a robot or fixed camera.

The acquisition image comprises product images and shelf labels. The labels may have multiple classes of product reference information that includes information that may be unique to the local store where a product is residing, information that is unique for a product among multiple stores of a retail chain, and information that is a unique number for a product among a particular industry, such as a UPC code. A prime ID associated with the product may or may not be displayed on the shelf label. Any individual products detected in the acquisition image will have a primary association with a particular shelf label within the acquisition image (i.e., are placed in an area on a shelf associated with a certain shelf label).

The product library comprises features of images representing variations of a product, for example, pose or labelling variations, and an associated prime ID. The group of features of the product images are obtained using a trained machine learning model (i.e., a feature extractor) which is trained to extract the features from the images and to output a prime ID associated with the product images.

Product images extracted from the acquisition image are feature matched against product source images in the product library and ranked based on the highest confidence in the association between product images from the acquisition image and source product images. Product images with the same product and label primary association are grouped together, for example, by placing the image features into one folder or assigning the same digital designation (or tag) for one particular product or a type of product.

Features extracted from the product images may be grouped together within the product library if the product images share any of the same product reference information from the label. For example, product images may be grouped together if the label information associated with the product image indicates that the image is for the same product from another store within the retail chain. Alternatively, the images could be images for the same product from another retail chain within the industry or if the associated label is the same label for associating a product at a different point in time.

The system further enrolls each group's product identity into the product library based on the machine learning model that implements at least one of the following principles: (a) where a product image from an industry catalog is available, the catalog product image and its respected industry-accepted codes are used to match all available images grouped together; (b) ranking the product images extracted from acquired images based on best match to a source images for a particular product. This assumes that an arbitrary number of the top-ranked product images is the true representation of the product; (c) determining the "true" form of the product by performing statistical analysis in some representations of the set of product images extracted from the acquired images with partially or fully shared product reference information. Based on the true form of the product, the system will infer some product images as outlier product images (i.e., noisy images) if they fall out of the top population of the product images measured by the statistical analysis; and (d) deploying the combination or the repetition any of steps (a), (b) or (c) to continue to optimize the accuracy for the matching result of the product image and product identity. In some embodiments, the recognized noisy images may be used to determine the product captured in the noisy images to be a misplaced product.

In another aspect of this embodiment, a method of building a product library that can be used for general machine learning training is disclosed. In this aspect, a system is provided to take images of new or re-packaged products and learns to recognize the new product with the new packaging or appearance. This ongoing learning feature makes it easy for the system to stay updated with new products or products having a new appearance.

One aspect of this embodiment includes detecting misplaced products by matching features extracted from a test images (e.g., product images extracted from a panoramic image 300 of a retail shelf captured during a periodic run of a robot through the store) with features extracted from source (i.e., ground truth) images which are stored in the product library. If a match is found, the prime ID associated with the test image and the prime ID of the associated with the matching source images are compared. If they fail to match, the product in the test image is identified as a misplaced product. The method comprises the steps of: comparing features of the test image with features of the product images in the product library; comparing a retail reference image directly with the test image; using the retail reference image for the prime ID, if they exist, and, if they do not exist, using the images in the product library to do the matching; and finding the closest matches of the retail reference image to the product library and using those image features to do the comparisons against the test image. If the prime ID associated with the test image doesn't match with the prime ID associated with the best fit from the product library, then the product in the product image is flagged as a misplaced product.

Figure 17:
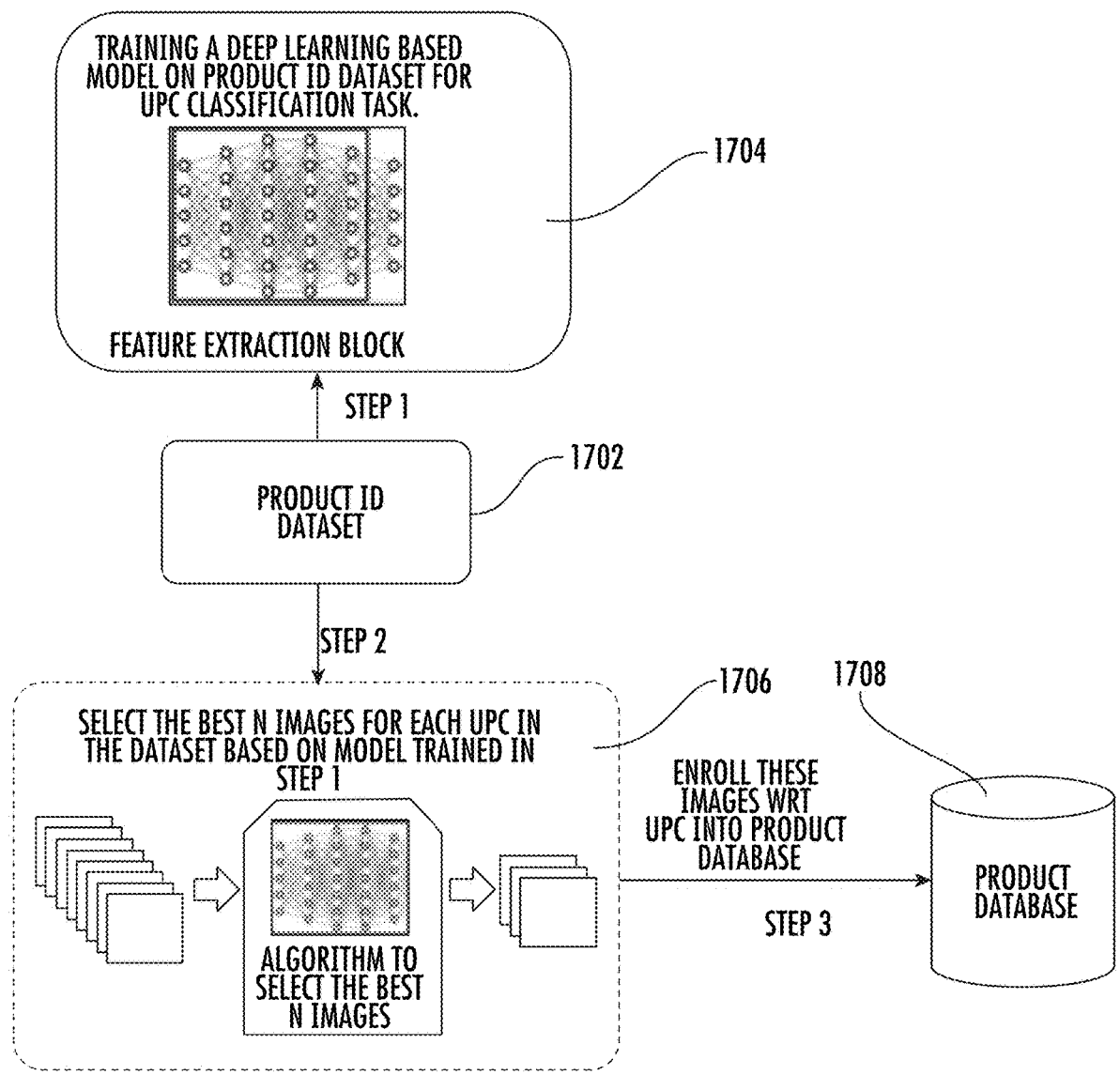
FIG. 17 is a diagram showing the training pipeline for the feature extractor and the product library.

FIG. 17 is a block diagram showing the training phase of the machine learning model. Given a product ID dataset 1702, the first step is to build a training pipeline. The pipeline includes the following blocks: (1) a feature extraction block; (2) a feature selection block; and (3) an enrollment engine. Product ID data set 1702 contains UPC level product images across different stores, different missions and different departments.

The first step of the process is the training of the feature extractor depicted in FIG. 17 as 1704, in which a deep learning model for a prime ID classification task is trained on the product ID data set 1702. The weights of the trained model are later used for feature extraction tasks. Features extracted by the model will be robust enough to be discriminative to all other prime ID classes while being invariant to different variations of its prime ID class, for example, different UPC codes of products in the same class.

In a second step of the process, shown in FIG. 17 as 1706, a predetermined number of the best image features representing a prime ID class are selected using a novel approach of removing outliers followed by a clustering algorithm. The predetermined number of best image features for each prime ID class are selected using the feature extractor 1704 trained in step 1. The image features selected may represent different variations for a particular prime ID, for example, pose variations or variations in the product labelling.

In the last step of the process, shown in FIG. 17 as 1708, the predetermined number of best image features for each prime ID are enrolled into the product library 1708. First, the features for the predetermined number of best images are extracted using the trained feature extractor 1704. Then, the extracted features, along with their image statistics, are enrolled in the product library 1708 with their associated prime IDs.

Figure 18A:
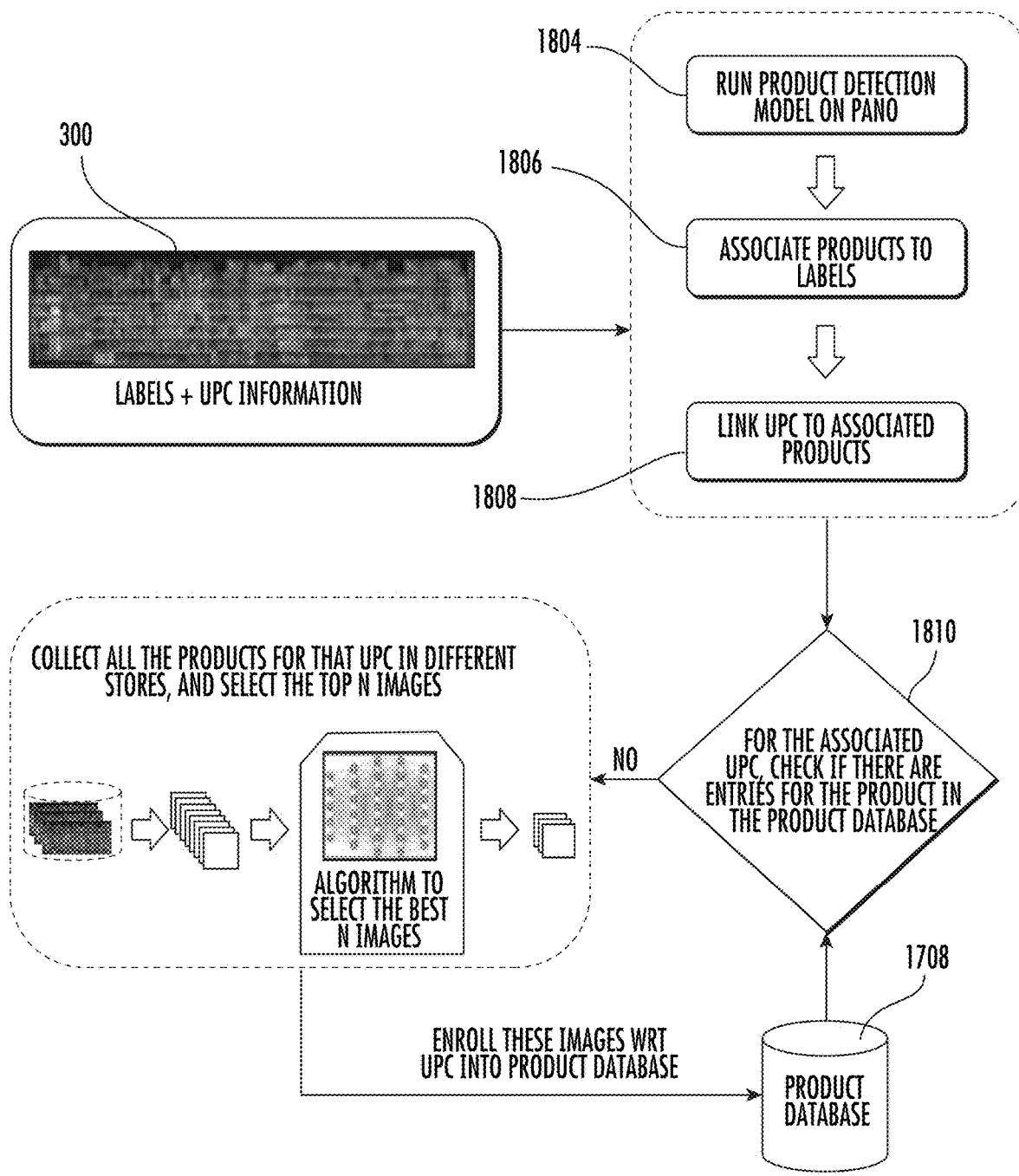
FIGS. 18A-18B are diagrams showing use of the feature extractor to match product images extracted from an image of a retail shelf with ground-truth images of the product.
Figure 18B:
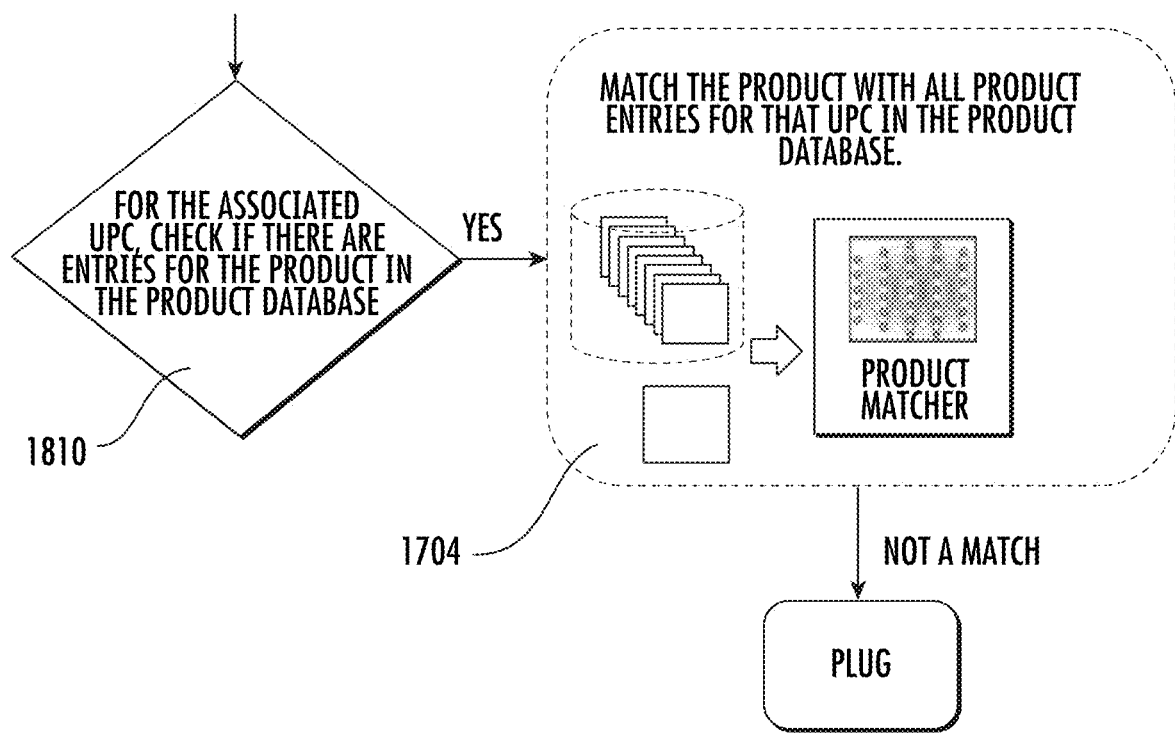

In the testing (i.e., production use) phase, shown in FIGS. 18A-18B, a panoramic image 300, typically acquired by robot or fixed camera in a retail establishment, is analyzed to detect misplaced products shown in the image. Given the panoramic image 300 along with the label and prime ID information, products are associated with prime IDs. At 1804, the product detection model is run on the panoramic image 300. At 1806, products are associated with the corresponding labels based on the association logic previously discussed (See FIG. 10). Finally, at 1808, the products are associated with a prime ID from the labels with which they are associated.

At 1810, the product library 1708 is queried to determine if there are any entries for the prime ID associated with the detected product. If no entries are found, as shown in FIG. 18A, all of the features extracted from images associated with the prime ID are collected and the extracted image features from those product images are enrolled in the product library 1708, along with the associated prime ID. If there are entries in product library 1708 which correspond to the prime ID, as shown in FIG. 18B, the features for the product image are extracted by feature extractor 1704 and compared with all of the stored image features using a product matching network. A product is predicted to be a misplaced product if it is not matched with any of the entries corresponding to each prime ID in the database.

Figure 19A:
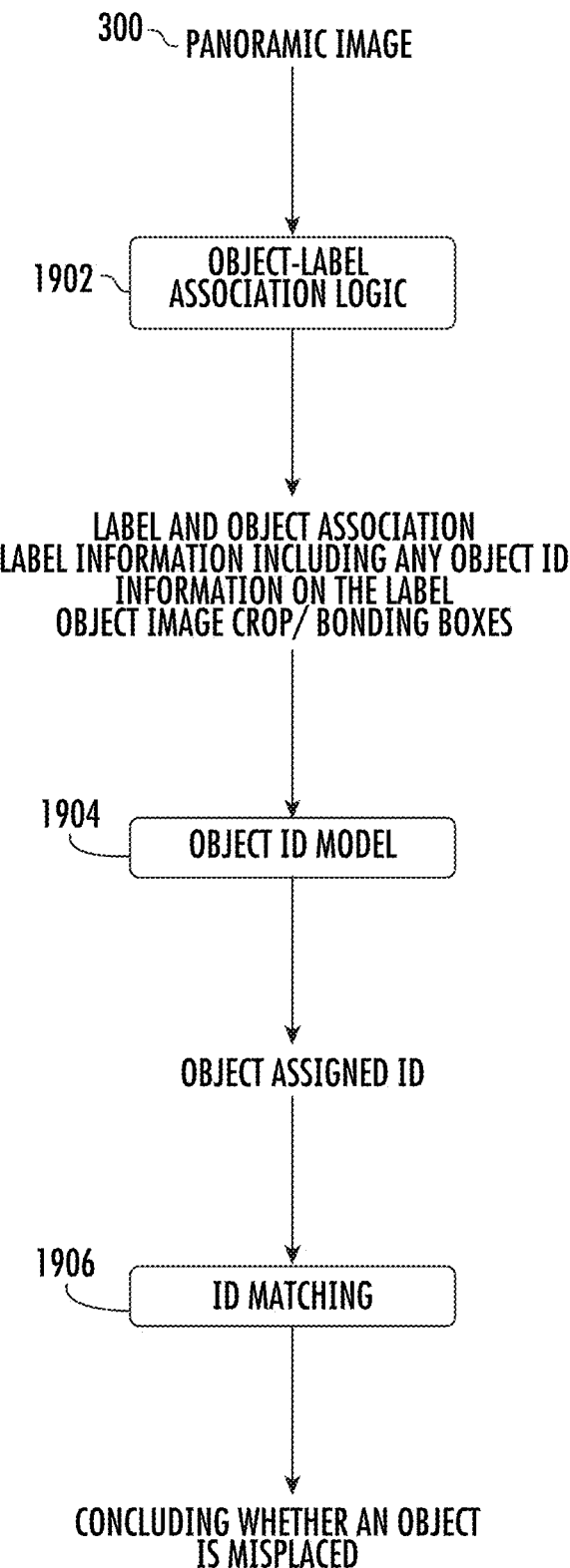
FIGS. 19A-19C are flow charts showing the process for identifying misplaced products on a retail shelf.
Figure 19B:
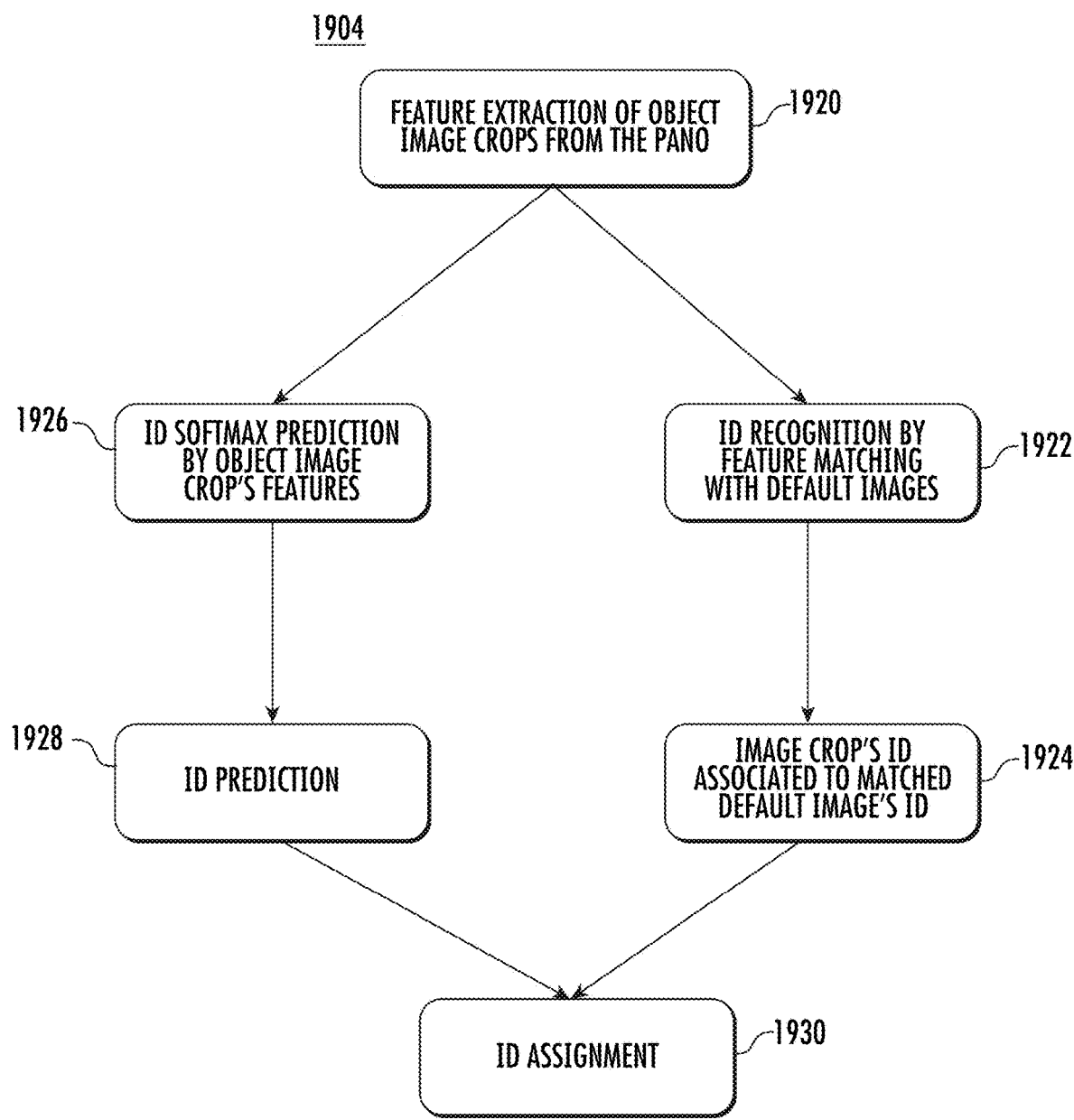

FIGS. 19A-19B comprise a flowchart showing the method previously described with respect to FIG. 18. Object-label association logic 1902 takes as input panoramic image 300. The system applies an object detection model in the panoramic image 300 to infer bounding boxes (see FIG. 5) around the products shown in the image. The object detection model may be, for example, process 402 shown in FIG. 4. The system then associates the detected product images with a shelf label (see FIG. 10) based on the object-label association logic 1902. Object-label association logic 1902 may be, for example, process 422 shown in FIG. 4. The system then links the prime ID, read from or extracted from information on the shelf label with which the detected product image is associated.

For each detected product image, the system applies an object ID recognition model 1904 that is trained to infer ate prime ID of a product. For example, the system may apply the object ID recognition model 1904 to infer a product prime ID based on the product image captured from the panoramic image 300. In preferred embodiments, object ID recognition model 1904 is feature extractor 1704.

The object ID recognition model 1904 is shown in detail in FIG. 19B. At 1920, features are extracted from the product images obtained from panoramic image 300. At 1922-1924, feature extractor 1704 matches features of the product image to the source image features in product library 1708. Feature extractor 1704 outputs the prime ID associated with the product image extracted from the panoramic image 300. The features extracted from the product image detected in panoramic image 300 are matched with features in the product library 1708.

Alternatively, at 1926-1928, the feature extractor 1704 may predict the prime ID (e.g., the UPC code), by directly mapping an object's prime ID based on a Softmax prediction through feature matching with the weight of the last layer. In either case, the end result is the assignment of a prime ID to the product image taken from the panoramic image 300.

Figure 19C:
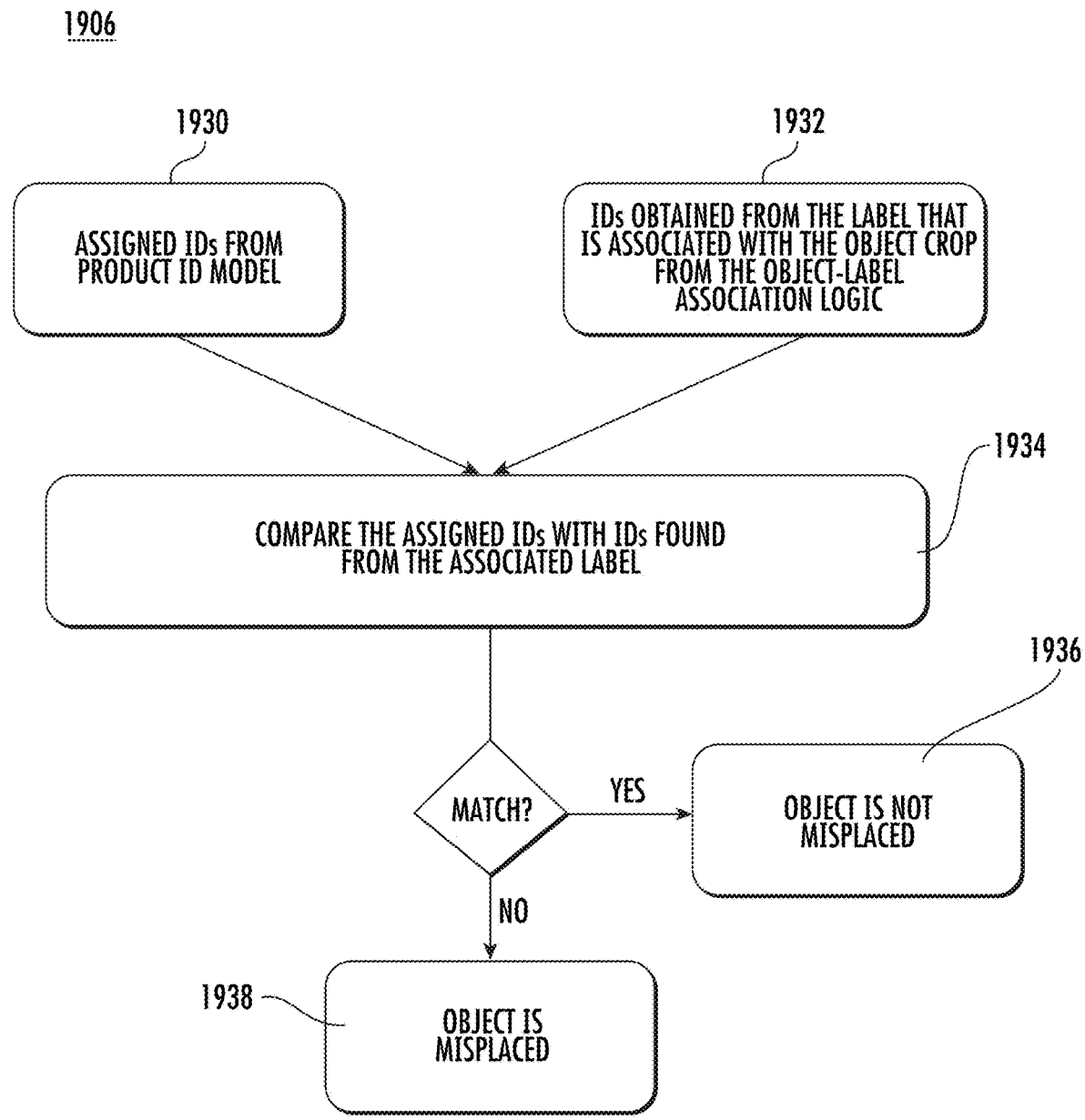

FIG. 19C shows the prime ID matching process in detail. The assigned prime ID from the feature extractor 1704, as shown in FIG. 19B at 1930, is compared, at 1934, with the prime ID at 1932 obtained from the label which is associated with the product image in the panoramic image 300. If there is a match, at 1936, it is determined that the product is not misplaced. However, if no match is found, it is determined, at 1938, that the product is misplaced and, as such, is classified as a misplaced product (i.e., a plug). A spread is a special case of a plug wherein the misplaced product is associated with a shelf label adjacent to the shelf label associated with the product image in the panoramic image 300. To detect a spread, the prime ID associated with the product image, as determined by feature extractor 1704, may be compared with the prime ID from adjacent shelf labels. If the prime ID based on the product image matches with its neighboring label UPC, then the product is flagged as a spread.

Enrollment of Seasonal Packaging or New Products

Given the panoramic image 300 along with label information and prime ID information for the labels, seasonal packaging or new products may be auto-enrolled in feature extractor 1704. To accomplish this, product detection model 402 is run on panoramic image 300 to infer the bounding boxes around the product images. The product images are associated with labels based on product-label association algorithm 422 and a prime ID associated with the label is obtained. For every product, the product database is queried to see if there any entries for the associated prime ID. If there are entries corresponding to the label prime ID, the features are extracted from the product image using feature extractor 1704 and the extracted features are compared with all features corresponding to the prime ID within product library 1708. If the features extracted from the product image are not matched with any of the features corresponding to its prime ID in the database, an attempt is made to match the product across different stores with the products associated with the same prime ID. If this fails, the product is flagged as a misplaced product. If the product does match with the products associated with the same prime ID across different stores, then it is assumed that these products are a new seasonal packaging of the product that is associated with the prime ID. The features for the products with new seasonal packaging are extracted using feature extractor 1704. These features are then enrolled, along with the prime ID, into product library 1708.

Removal of Outliers in the Product ID

The process for the enrollment of seasonal packaging or new products is prone to errors if there is a wrong product enrolled in the database under any prime ID tag, causing the wrong prime ID to be identified. To fix this problem, the wrong product can simply be removed and the plug determination sequence described above can be rerun without retraining feature extractor 1704.

The feature extractor 1704, as shown in FIG. 17, may be developed by training a deep neural network coupled with data augmentation and auxiliary loss functions in combination with a cross-entropy loss. The architecture of the model may use models including, but not limited to, Resnets, Densenets and Efficientnets. A number of different data augmentation strategies may be used in this model, including, but not limited to, random cropping, cutmix, mirroring label smoothing and mixup. The feature extractor 1704 may be trained with methods that include but not limited to: using ring loss, training a patch-based variational autoencoder model to learn the product representations which is used for computing the product similarity in plug detection and we also use this to train a discriminative classifier to do the n-way prime ID classification.

To counter model divergence during training, the feature extractor 1704 uses cosine learning rate decay and used weight regularization to counter overfitting. Early stopping is also performed as part of the countermeasures for overfitting. The source images in the training data for the feature extractor 1704 are extracted from panoramic images or any other digital images. Trained object and label detectors are run on the panoramic images to detect the labels and product images. The labels are then associated with the product images using product-shelf label association process 422, shown in FIG. 4, the result is a correlation of an object with a respective prime ID, such as the UPC code, extracted from the labels and grouped together by digital category. The product images from panoramic image 300 are processed through a data cleaning model to remove any images that are considered outliers for the representation of the object. The post-cleaning product images are used for the final training and used as a test set for feature extractor 1704.

The feature extractor 1704, in preferred embodiments of the invention, is trained to recognize features of the product image and output an associated UPC code. However, as would be realized by one of skill in the art, the feature extractor model 1704 may be trained to output any data associated with the product images, for example a prime ID associated with the label with which the product is associated. The explanations herein of the invention in terms of feature extractor 1704 outputting a prime ID is not meant to limit the invention to that implementation.

Once it has been determined that a product is out-of-stock, that is, there is a shelf label or peg label having no associated products, it is necessary to identify those products to the store. It should be noted that the out-of-stock list only knows that a particular shelf or peg label has no products associated with it. There is no knowledge at this point of the identity of the product referred to by the information on the shelf or peg label. To determine the identity of the product, the system uses a mapping between the shelf and peg label positions on the image and the shelf and peg labels in the original high-resolution images captured by the inventory monitoring camera system 100. The high-resolution images are those images which were stitched together to create image 300 of the shelf. In the high-resolution images, the system is able to read the content of the shelf and peg labels, for example, bar codes or text and is thus able to identify the product referred to by the contents of the shelf or peg label. The identity of the out-of-stock items can thus be identified to the store.

In box 442 of FIG. 4, visualization on a web page may be provided to indicate the location and identity of out-of-stock items, plugs and spreads.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A computer-implemented method comprising:
    obtaining an image containing multiple objects using a camera;
    obtaining identifying information associated with a region of interest in the image;
    extracting an object image from the image, the object image containing an individual object located in the region of interest;
    extracting features from the object image using a trained feature extractor;
    determining a best-fit match between features extracted from the object image and features associated with objects in an object library;
    receiving an identifier associated with the best-fit match;
    determining that the best-fit match identifier does not match the identifying information associated with the region of interest; and
    indicating that the object in the object image is not associated with the other objects in the region of interest;
    wherein the method is implemented in software executing on a processor; and
    wherein the trained feature extractor is a deep neural network trained to on a dataset comprising multiple views of each object and associated identifying information of each object.

2. The method of claim 1 wherein the method is repeated for each object image detected in the image.

3. The method of claim 1 wherein the object library is built by a method comprising:
obtaining a source image and identifying information for each object;
acquiring multiple images of each object from a plurality of sources;
ranking the acquired images based on a highest confidence in an association between the acquired images and the source image;
selecting a pre-determined number of top-ranked acquired images; and
storing features extracted from the source image and the top-ranked acquired images, and the identifying information associated with the source image and the top-ranked acquired images, in the object library.

4. The method of claim 3 wherein the acquired multiple images for each object include images exhibiting different variations and/or viewpoints for each object.

5. The method of claim 3 wherein the feature extractor is trained on an object ID dataset comprising multiple images of each object and associated identifying information.

6. The method of claim 5 wherein the feature extractor outputs the identifying information, given an image of the object as input.

7. The method of claim 5 wherein the multiple images of each object include images of the object exhibiting pose variations.

8. The method of claim 5 wherein the multiple images of each object include images of the object exhibiting variations in labelling of the object.

9. The method of claim 5 wherein the multiple images of each object include images of the object associated with different identifying information.

10. The method of claim 1 further comprising:
determining that the identifier associated with an object image does not exist in the object library, indicating a new object; and
enrolling features extracted from the object image and the associated identifier in the object library.

11. The method of claim 1 further comprising:
determining that the features extracted from the object image are not a best fit with the features in the object library;
determining that the identifier associated with an object image does exist in the object library;
determining that the object image represents an existing object with new labelling; and
associating features extracted from the object image with the existing identifying information in the object library.

12. The method of claim 1 further comprising:
determining that the best fit match matches identifying information from an adjacent region of interest; and
identifying the individual object as a spread.

13. A system comprising:
a camera, for obtaining images containing a plurality of objects;
a processor, executing software for analyzing the images;
a feature extractor trained to extract features from an object in the image and output identifying information associated with the object; and
an object library containing features extracted from multiple objects within the image, the features associated with identifying information of the object;
wherein the software performs the functions of:
obtaining an image containing multiple objects using the camera;
obtaining identifying information associated with a region of interest in the image;
extracting an object image from the image, the object image containing an individual object located in the region of interest;
determining a best-fit match between features extracted from the object image and features in the object library;
receiving an object identifier associated with the best-fit match; and
determining that the object identifier associated with the best fit match does not match the identifying information associated with the region of interest; and
indicating that the individual object is not associated with other objects in the region of interest;
wherein the feature extractor is a deep neural network trained to on a dataset comprising multiple views of each object and associated identifying information of each object.

14. The system of claim 13 wherein the object library is built by:
obtaining a source image and identifying information for each object;
acquiring multiple images of each object from a plurality of sources;
ranking the acquired images based on a highest confidence in an association between the acquired images and the source image;
selecting a pre-determined number of the top-ranked acquired images; and
storing features extracted from the source image and the top-ranked acquired images, and the identifying information associated with the source image and the top-ranked acquired images, in the object library.

15. The system of claim 14 wherein the acquired multiple images for each object include images exhibiting different variations and/or viewpoints for each object.

* * * * *